United States Patent [19]

Imai et al.

[11] 4,351,005
[45] Sep. 21, 1982

[54] RECORDING APPARATUS

[75] Inventors: Nobuhiro Imai; Kimio Kono; Kazuo Hoshito, all of Kawasaki; Takehiko Kiyohara, Zama; Hideaki Sato, Yokohama, all of Japan

[73] Assignee: Canon Kabushiki Kaisha, Tokyo, Japan

[21] Appl. No.: 179,174

[22] Filed: Aug. 18, 1980

Related U.S. Application Data

[63] Continuation of Ser. No. 915,079, Jun. 13, 1978, abandoned.

[30] Foreign Application Priority Data

Jun. 21, 1977 [JP]  Japan ................................. 52-74225
Jul. 1, 1977 [JP]  Japan ................................. 52-79313
Aug. 3, 1977 [JP]  Japan ................................. 52-93500

[51] Int. Cl.³ ............................................. H04N 1/30
[52] U.S. Cl. ................................... 358/300; 358/302; 358/208; 355/3 R; 350/6.6; 346/76 L; 346/160; 346/109; 310/68 C; 357/81
[58] Field of Search ............... 358/302, 300, 264, 208, 358/285, 293; 355/3 R, 14 R; 350/6.6; 250/236, 235; 346/76 L, 109, 108, 160, 153.1; 310/68 C; 357/81; 369/119, 122

[56] References Cited

U.S. PATENT DOCUMENTS

| | | | |
|---|---|---|---|
| 3,465,352 | 9/1969 | Carlson | 346/76 L |
| 3,701,999 | 10/1972 | Congleton | 346/76 L |
| 3,930,186 | 12/1975 | Sekiya | 310/68 C |
| 3,944,323 | 3/1976 | Starkweather | 358/300 |
| 3,953,878 | 4/1976 | Mawbinary | 357/81 |
| 3,971,044 | 7/1976 | Findley | 354/9 |
| 3,974,506 | 8/1976 | Starkweather | 358/300 |
| 3,999,010 | 12/1976 | Oosoka | 358/302 |
| 4,037,231 | 7/1977 | Broyles | 350/6.6 |
| 4,059,833 | 11/1977 | Kitamura | 364/900 |
| 4,079,410 | 3/1978 | Schierz | 357/81 |
| 4,097,891 | 6/1978 | Selway | 357/81 |
| 4,099,829 | 7/1978 | Straayer | 350/6.6 |
| 4,169,275 | 9/1979 | Gunning | 358/300 |

FOREIGN PATENT DOCUMENTS

| | | | |
|---|---|---|---|
| 1314904 | 4/1973 | United Kingdom | 358/300 |
| 1399701 | 7/1975 | United Kingdom | 358/300 |
| 1406148 | 9/1975 | United Kingdom | 358/300 |
| 1452298 | 10/1976 | United Kingdom | 358/300 |
| 1452300 | 10/1976 | United Kingdom | 358/300 |

*Primary Examiner*—Alan Faber
*Attorney, Agent, or Firm*—Fitzpatrick, Cella, Harper & Scinto

[57] ABSTRACT

A recording apparatus including a beam generator for generating a beam modulated by a modulating signal supplied thereto; a deflector for deflecting the beam generated by the beam generator repeatedly in two directions; a recording member for receiving the beam deflected by the deflector and recording the trajectory of irradiation by the beam; a recording information storage for storing information to be recorded on the recording member; the recording information read from the information storage being supplied to the beam generator as the modulating signal; a beam detector provided in the deflecting area of the beam deflected by the deflector and adapted to release a beam detection signal upon detection of arrival of the deflected beam at the detector; and a signal forming device adapted for selecting either one of two consecutive beam detection signals released from the beam detector thereby forming a reference signal for instructing the initiation of the readout from the recording information storage.

31 Claims, 38 Drawing Figures

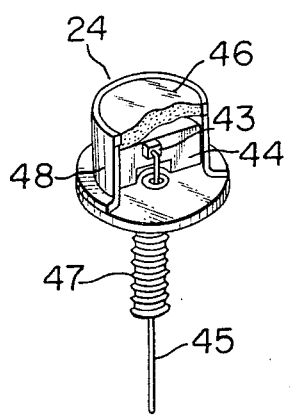
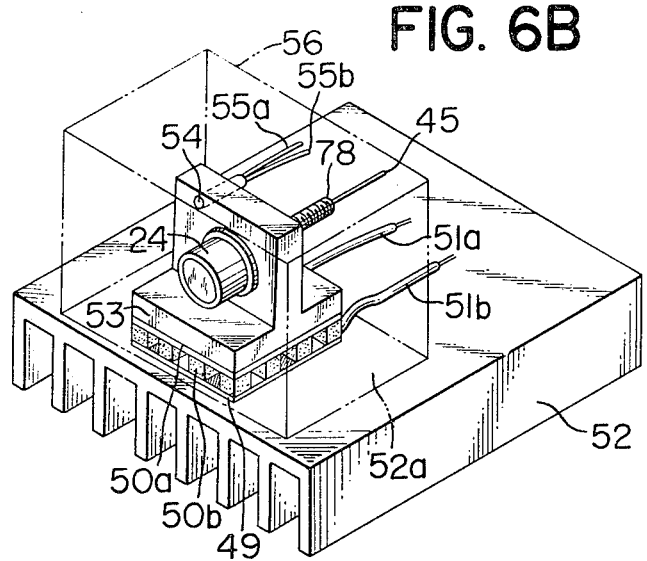
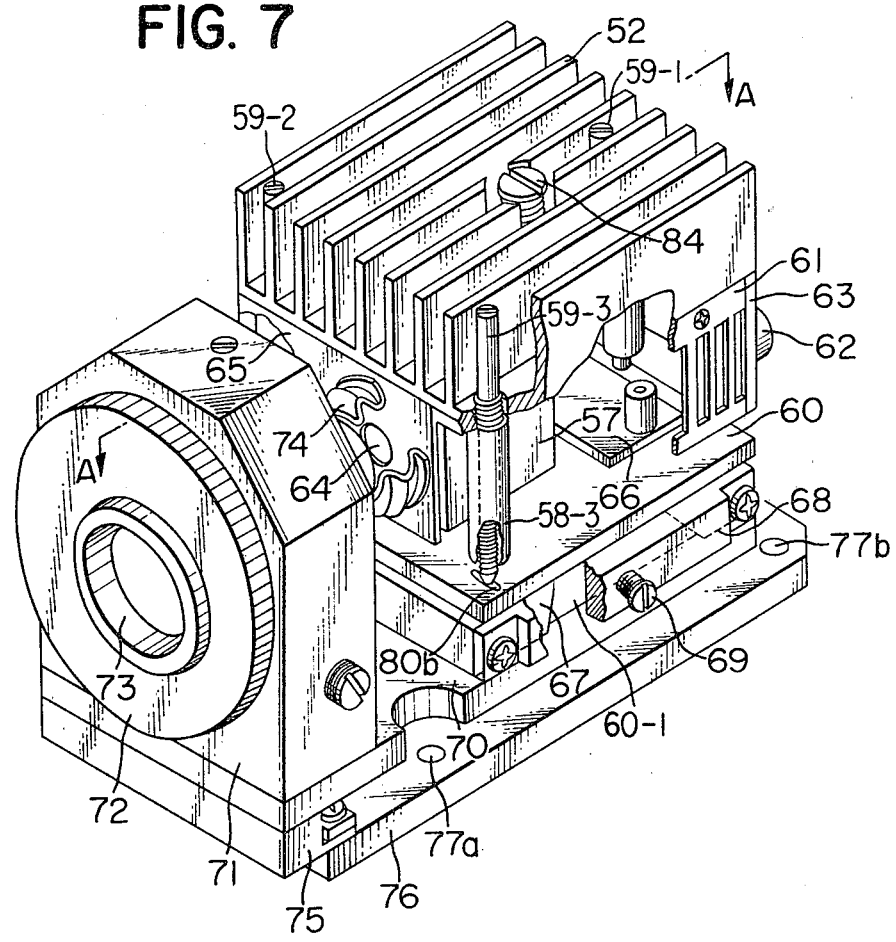

A DRUM CLOCK

B POWER-ON SIGNAL

C BEAM DETECTION SIGNAL

D RESET SIGNAL

E PHOTOSENSITIVE DRUM DRIVING SIGNAL

F PAPER FEED PULSE

G TOP SIGNAL

H RECORD SIGNAL

I PAPER TRANSPORT SIGNAL

K PAPER OUT SIGNAL

L PRINTER START SIGNAL

FIG. 25
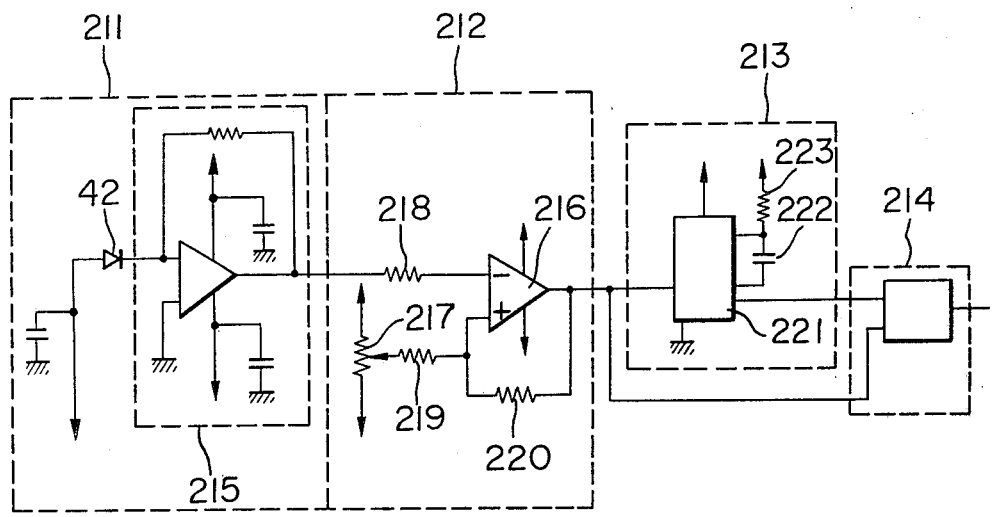
FIG. 26A
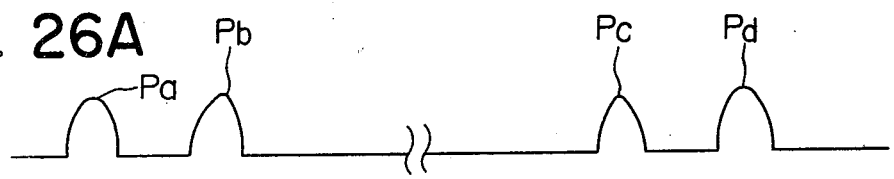
FIG. 26B
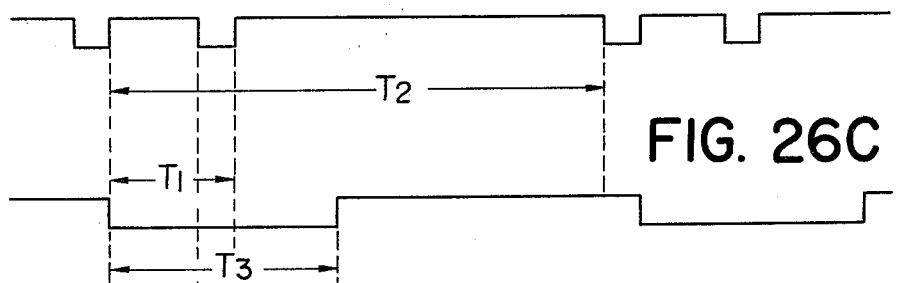
FIG. 26C
FIG. 26D

RECORDING APPARATUS

This is a continuation of application Ser. No. 915,079, filed June 13, 1978, now abandoned.

BACKGROUND OF THE INVENTION

1. Field of the Invention

The present invention relates to a recording apparatus for high-speed beam recording of image information such as characters and graphics supplied from a computer or a facsimile transmitter, and more particularly to a recording apparatus for information recording by periodically changing the scanning direction of said beam.

2. Description of the Prior Art

With the recent development of computers there have been desired high-speed and high-quality output apparatus for image information such as characters and graphics. As the high-speed output apparatus principally for character information there are conventionally known a mechanical impact line printer of drum type, a multistilus electrostatic printer, a cathode ray tube printer composed of a combination of a cathode ray tube (principally an optical fiber tube) and the electrophotographic process.

The mechanical impact line printer, however, is associated with the drawbacks of limitation in speed, noise, poor reliability etc.

Also the multistylus electrostatic printer has a limitation in resolution, and requires expensive electrostatic recording paper. Further, the cathode ray tube (CRT) printer is difficult to maintain a high print quality for a prolonged period because of the stability of the CRT drive circuit and also requires a very large volume for the entire apparatus because of the presence of bulky cathode ray tube. Consequently the conventional output apparatus for characters and graphics have not been satisfactory, particularly for characters requiring a high quality such as Chinese characters. Also as the apparatus for the output principally of graphic information there have conventionally known a mechanical X-Y plotter, a drafter, a multistilus electrostatic plotter, a CRT plotter for optically recording a graphic information displayed on a cathode ray tube. However the mechanical X-Y plotter and drafter are very slow in the recording speed while the multistylus electrostatic plotter is disadvantageous because of low resolution, use of special recording paper and its expensiveness, and the CRT plotter is associated with the drawbacks resulting from the low resolution, poor stability and insufficient light intensity of cathode ray tube itself.

In order to eliminate the above-mentioned drawbacks there have been proposed, as disclosed for example in the U.S. Pat. No. 3,971,044 and the U.S. Pat. No. 4,059,833 assigned to the assignee of the present application, recording apparatus in which a beam such as a laser beam modulated by the signal to be recorded is deflected to scan a recording member thereby achieving a high-speed recording on said member. Such recording apparatus, wherein beam deflection being achieved by a rotary polygonal mirror of an elevated mass, requires a large beam deflecting mechanism, thus resulting in a large and expensive device. Also in such case there is required a certain time for the start-up of the recording apparatus as said polygonal mirror has to be accelerated to a predetermined high speed.

SUMMARY OF THE INVENTION

The object of the present invention is to provide a recording apparatus capable of avoiding the drawbacks of the conventional recording apparatus as explained in the foregoing.

Another object of the present invention is to provide a recording apparatus which is capable of high-speed recording but is of small size and weight.

Still another object of the present invention is to provide a recording apparatus capable of recording information exactly and with a high resolution on a recording medium.

Still another object of the present invention is to provide a recording apparatus allowing easy adjustment.

Still another object of the present invention is to provide a recording apparatus provided with a stable recording performance.

Still another object of the present invention is to provide a recording apparatus allowing a reduced start-up time.

BRIEF DESCRIPTION OF DRAWINGS

FIGS. 1 to 5 are drawings of a recording apparatus embodying the present invention wherein FIG. 1 is a lateral cross-sectional view thereof;

FIG. 2 is a perspective view thereof;

FIG. 3 is a partially cut-off perspective view thereof;

FIG. 4 is a partial planar view thereof;

FIG. 5 is a partial lateral view thereof;

FIG. 6A is a partially cut-off perspective view showing a semi-conductor laser;

FIG. 6B is a perspective view showing a cooling element provided with a semi-conductor laser;

FIGS. 7 and 8 are drawings of a laser unit wherein FIG. 7 is a perspective view thereof while FIG. 8 is a lateral view thereof;

FIGS. 9 and 10 are drawings of a beam detecting unit wherein FIG. 9 is a perspective view thereof while FIG. 10 is a partially exploded perspective view thereof;

FIGS. 13A and 13B are drawings of a beam expander unit wherein FIG. 13A is a lateral cross-sectional view thereof while FIG. 13B is a planar view thereof;

FIG. 19 and FIG. 20 are drawings of a galvano-mirror scanner unit for explaining the adjustment thereof wherein FIG. 19 is a rear view thereof while FIG. 20 is a planar view thereof;

FIGS. 21 and 22 are drawings of a mirror unit wherein FIG. 21 is an exploded perspective view thereof while FIG. 22 is a planar view thereof;

FIG. 25 is a circuit drawing showing a beam detecting circuit;

FIGS. 26A, 26B, 26C and 26D are wave-form charts for explaining the functions of the circuit shown in FIG. 25;

DESCRIPTION OF THE PREFERRED EMBODIMENT

Now there will given a detailed explanation on an embodiment of the present invention while making reference to the attached drawings.

Figure 1:
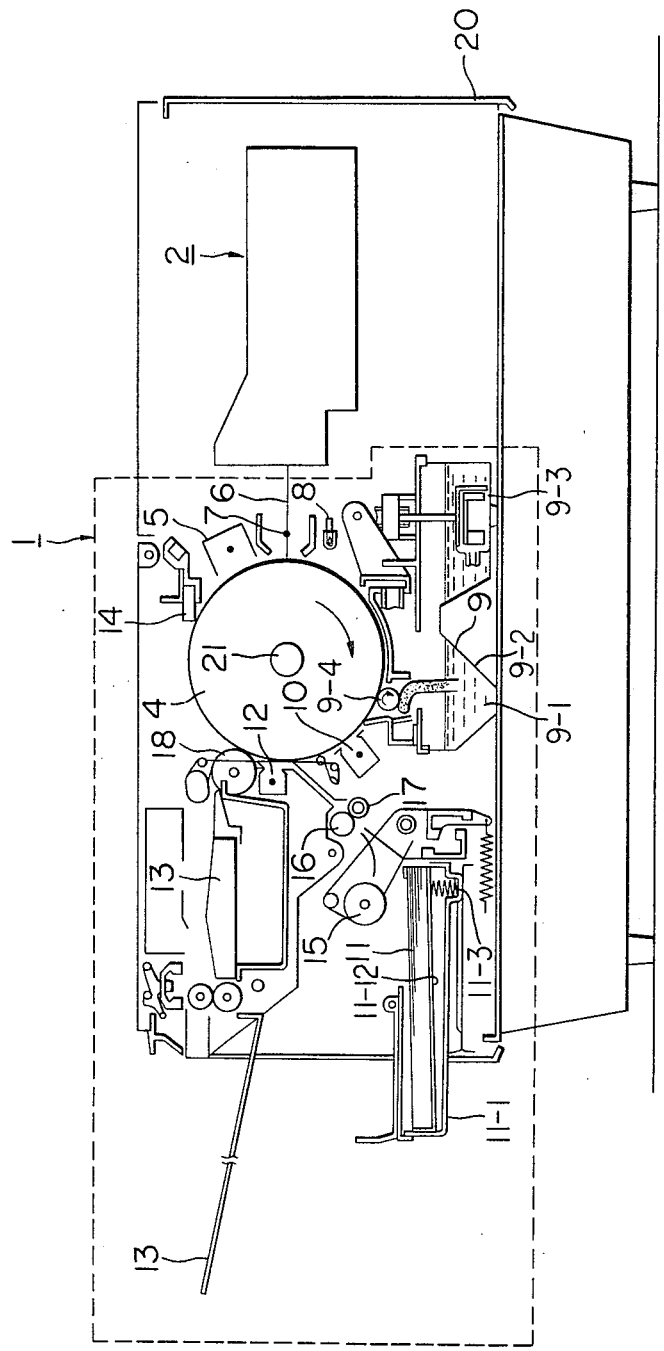
Figure 2:
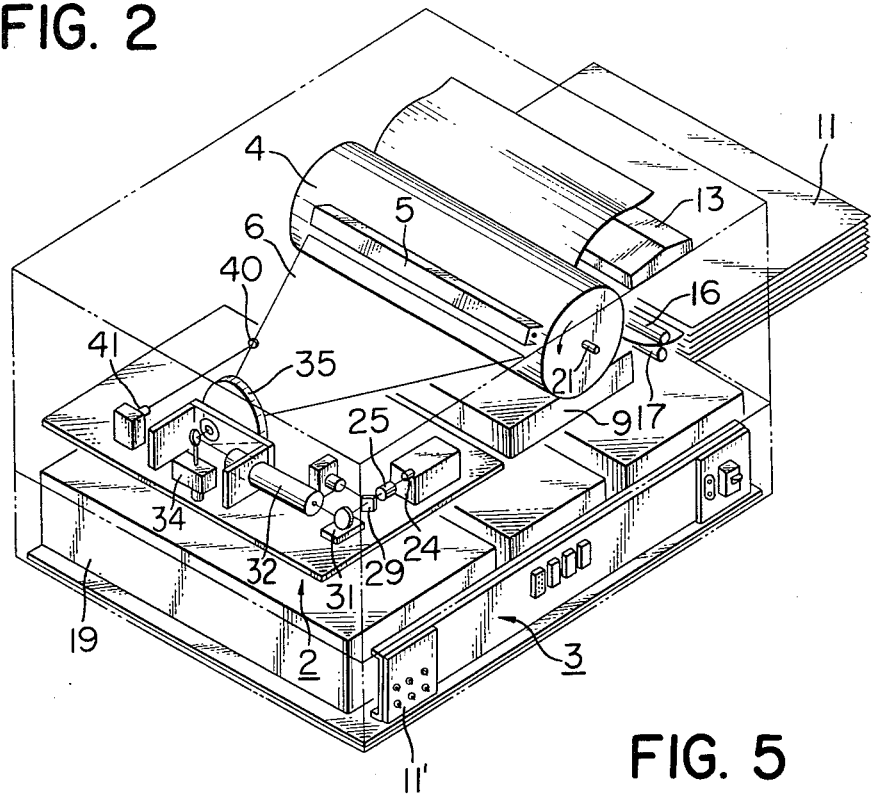
Figure 3:
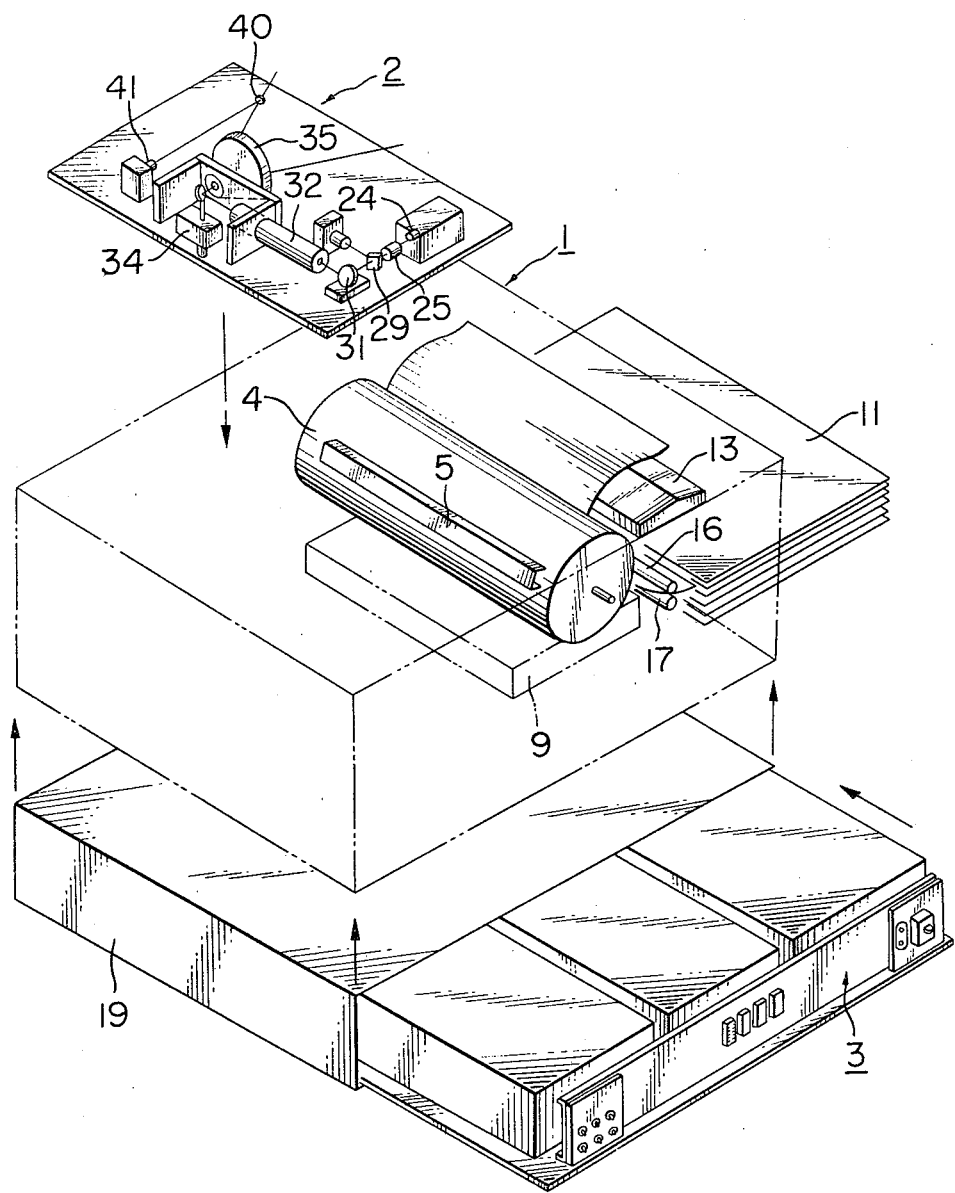

FIGS. 1, 2 and 3 are a lateral cross-sectional view, a perspective view and a partially exploded perspective view, respectively, of a recording apparatus embodying the present invention wherein there are shown a recording section 1 utilizing an electrophotographic process, an optical section 2 emitting an information modulated laser beam to said recording section 1, and a control section 3 for controlling said recording section 1 and optical section 2. Said recording section 1 is accommodated in an upper section of a casing 20 of the recording apparatus, and is designed to perform an electrophotographic process, for example, as disclosed in the U.S. Pat. No. 3,666,363 assigned to the assignee of the present application.

More specifically said process consists of uniformly charging, either positively or negatively, an insulating surface of a drum-shaped photosensitive element (photosensitive drum) 4 essentially composed of an electroconductive support member, a photoconductive layer and an insulating layer by means of a first corona charger 5, thereby capturing an electrostatic charge of a polarity opposite to that of said charging at the interface of said photoconductive layer and said insulating layer or within said photoconductive layer, then exposing said charged insulating surface to said laser beam 6 simultaneously with an AC corona discharge by means of an AC corona discharger 7 thereby forming a pattern of surface potential corresponding to the intensity change of said laser beam 6 on said insulating surface, then flush exposing said insulating surface uniformly to a lamp 8 thereby forming an electrostatic latent image of an elevated contrast on said insulating surface, developing said latent image with a developer essentially consisting of charged colored particles in a developing device 9 thereby rendering said latent image visible, then upon passing through a precharger transferring thus developed image onto a transfer material 11 such as transfer paper by means of a transfer charger 12, separating said transfer paper 11 from the photosensitive member 4 by means of a separator 18, and fixing the thus transferred image by means of a fixing device 13 consisting for example of an infrared lamp or a hot plate thereby obtaining an electrophotographic image printed on the transfer sheet which is ejected onto a tray 13. On the other hand said insulating surface after the image transfer is cleaned by a cleaning device 14 whereby the remaining charged particles are removed, and said photosensitive element 4 is rendered usable again for the process.

A paper feed roller 15 is provided for advancing a transfer sheet 11 which thus becomes engaged between register rollers 16, 17 and is then further advanced to the position of said transfer by said rollers upon receipt of a feed instruction.

In another upper section in said casing 20 of the recording apparatus there is accommodated the optical section 2 structured as an integral unit as will be explained later, and under said casing 20 there is provided a lower casing 19 accommodating said control section and a power supply source.

Because of the above-mentioned structure composed of separate plural units, said recording apparatus allows independent adjustment or repair for each functional unit.

Figure 5:
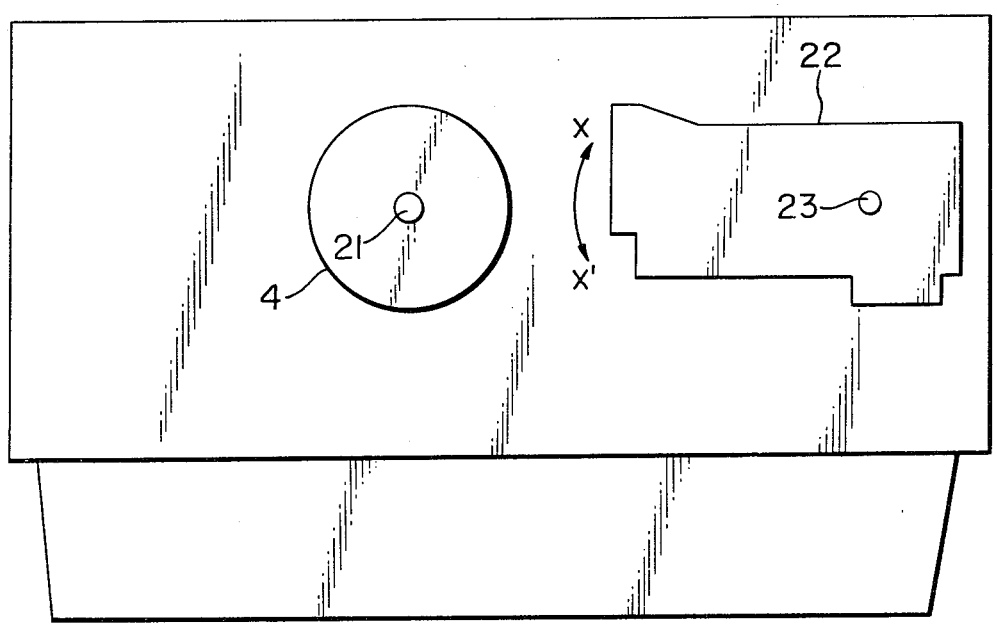
Figure 4:
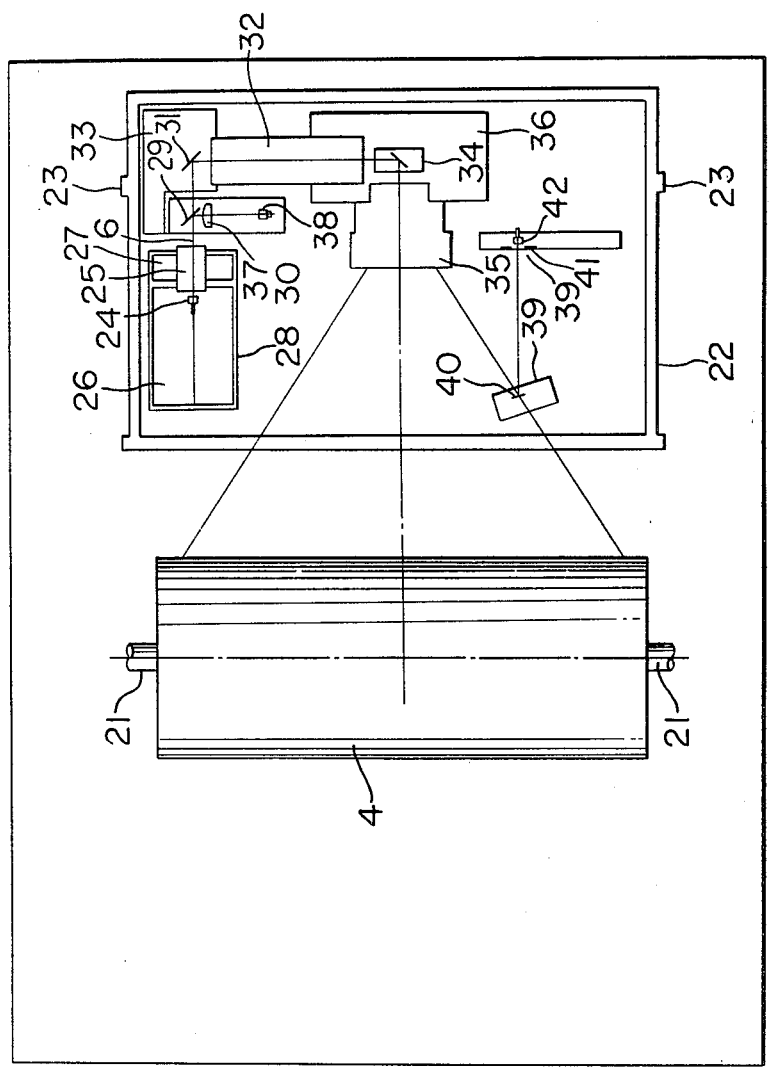

Now there will given a detailedly explanation of the aforementioned optical section 2 while making reference to FIGS. 4 and 5 which respectively are a planar view and a lateral view of the recording apparatus particularly illustrating said optical section, wherein an optical box 22 is provided inside said casing 20 and to the right of a photosensitive member 4 rotatably supported by a shaft 21 thereof, said optical box accommodating therein all the elements required for generating a laser beam for irradiating said photosensitive member 4.

Said optical box 22 is provided with support projections 23 approximately parallel to said shaft 21, said support projections 23 being rotatably supported by said casing 20, whereby said optical box 22 is rotatable in a direction X-X' around said projections 23 and fixable at an arbitrary position. A semi-conductor laser 24 generates a laser beam 6 intensity-modulated by an external input signal, said beam being directed to an objective lens 25. A support 26 for said semi-conductor laser 24 is provided with an adjusting mechanism for adjusting the position of said laser beam 6 to the optical axis of said objective lens 25, and a support 27 of said lens 25 is provided with a mechanism for displacing said lens 25 in the direction of the optical axis thereof. By the appropriate adjustment of said mechanisms, the structures of which are to be explained later, the laser beam 6 generated by said semi-conductor laser 24 becomes a parallel beam after passing the objective lens 25. Said supports 26 and 27 for said laser 24 and objective lens 25 are further fixed on a support 28 which is in turn provided with a mechanism for integrally displacing said laser 24 and objective lens 25 and changing the direction of the optical axis in the vertical plane. A part of the parallel beam emitted by the objective lens 25 is guided to a beam detector unit 30 comprising a half mirror 29, and after passing therethrough, is guided through a mirror unit 31 to the inlet opening of a cylindrical beam expander 32. Said mirror unit 31 is inserted in order to deflect the optical path in the horizontal plane thereby reducing the space in the apparatus and also to bring the laser beam 6 from the objective lens 25 to the optical axis of the cylindrical beam expander 32 by means of the adjust mechanisms provided on said support 28 for said laser 24 and objective lens 25 and also on a support 33 of said mirror unit 31, in a manner to be explained later. Said beam is expanded to a parallel beam of a desired diameter by means of said cylindrical beam expander, and guided to a galvanomirror 34. The horizontally sweeping beam coming out from said galvanomirror 34 is focused into a spot on said photosensitive member 4 by means of a focusing lens 35 of an arcsine characteristics to be explained later. A support 36 for the cylindrical beam expander 32, galvanomirror 34 and focusing lens 35 is integrally structures in such a manner that the crossing point of optical axes of said expander 32 and focusing lens 35 coincides with the reflecting point of said galvanomirror 34, with an aberration within the manufacturing error of said support 36. In this manner a focused spot can be obtained on the photosensitive member 4 as long as the laser beam 6 coincides with the optical axis of the beam expander 32 by the adjustment of mirror unit 31. The support member for said galvanomirror 34, of which details are to be explained later, is provided with a function of adjusting the position of said mirror 34 in such a manner to divide the scanning angle of the beam equally with respect to the optical axis of focusing lens 35 and to cause a scanning of the focused spot parallel to the center line of said photosensitive member without changing the beam reflecting point on said galvanomirror 34. The spot light focused by said focusing lens 35 is adapted for scanning a particular position on the photosensitive member 4 by means of a rotating mechanism in an X-X' direction provided in said optical box 22. The beam detector unit 30 is composed of a half mirror 29, a condenser lens 37 and a photoelectric converting element 38 and is provided to detect the intensity change of laser beam 6 and for controlling the intensity of the laser beam 6 generated by the semi-conductor laser 24 by means of the detection signal thereby maintaining the intensity of laser beam constant. The beam detector 39 is composed of a mirror 40, a small inlet slit 41 and a rapid-reponse photoelectric converting element 42 (for example a PIN diode). Said beam detector 39 is provided in order to detect the position of the laser beam 6 and to determine, by the detection signal thereof, the start timing of the input signal to the semi-conductor laser to provide desired optical information on said photosensitive member 4.

In this manner it is rendered possible to significantly reduce the aberration in the horizontal signal missynchronization resulting from uneven rotation of galvanomirror 34 thereby improving the image quality, and to increase the precision tolerance required for the galvanomirror 34 thereby enabling inexpensive manufacture.

In the above-mentioned manner the modulated laser beam is irradiated on the photosensitive member 4 and converted by the above-explained electrophotographic process into a visible image which is transferred and fixed on a plain paper and released as a hard copy.

In the following there will be given detailed explanations on each unit constituting said optical section 2.

Laser Unit

The semi-conductor laser employed in the embodiment of the present invention is very small and can be made with a dimension of a cube of 10 mm at maximum even with a package therefor as shown in FIG. 6A.

For effective continuous operation of such semi-conductor laser it is necessary in the present status of the art to mount the laser in a heat sink to effectively diffuse the heat generated in said laser or diode.

FIG. 6A is a partly cut-off perspective view showing the internal structure of a semi-conductor laser comprising a semi-conductor laser chip 43 smaller than 1 mm$^3$ in size of which one electrode is bonded to a heat sink 44 by means for example of indium solder, while the other electrode is bonded to a lead wire 45. Said heat sink 44 is fixed by means for example of indium solder in a metal shield 48 provided with a protective glass 46 and a mounting screw 47 and thus is separated from the surrounding atmosphere. Though such semi-conductor laser can be continuously oscillated at room temperature, the output emission is subject to fluctuation due to a variation in the external temperature and also a variation in the internal temperature depending on the length of modulation time. The fluctuation in the output emission should be suppressed to less than 1% in order to effect beam amplitude modulation in addition to the pulse modulation. Also in case of pulse modulation, the fluctuation should be experimentally less than 10% even when the incident energy level is selected at a saturation level of the photosensitivity of said photosensitive member. In order to minimize said fluctuation in the output emission, in the present embodiment, there are provide a means for externally cooling or heating said semi-conductor laser 24 to stabilize the temperature thereof and a means for controlling the output fluctuation by regulating the level of operating current in response to the detected output emission of said laser.

FIG. 6B is a perspective view of a device for external temperature control of a semi-conductor laser 24, wherein there are shown electronic cooling elements 49 in a number of several tens serially connected and insulated on both sides thereof with ceramic insulating plates 50a and 50b. Said cooling elements 49 are composed of a complex alloy of impure bismuth, tellurium, selenium, antimony etc. and cause, for example, heat generation on the surface of the ceramic insulating plate 50b and heat absorption on the surface of plate 50a by Peltier effect when supplied with a DC current through the lead wires 51a, 51b, said heat generation and absorption being inversed when the direction of current is inverted. 52 is a large heat radiator for emitting the heat generated by said cooling elements into the air, and 53 is a cooling member maintained in close contact with said insulating plate 50 and made of highly heat-conductive pure copper for performing cooling function by the heat absorption of said cooling elements. Said cooling member is maintained in close contact with the insulating plate 50a and is provided thereon with said semiconductor laser 24 and a thermister 54 for temperature detection, which shows a change in the resistance between the terminals 55a, 55b to control the current to said cooling elements 49 thereby stabilizing the temperature of said semi-conductor laser 24.

Figure 8:
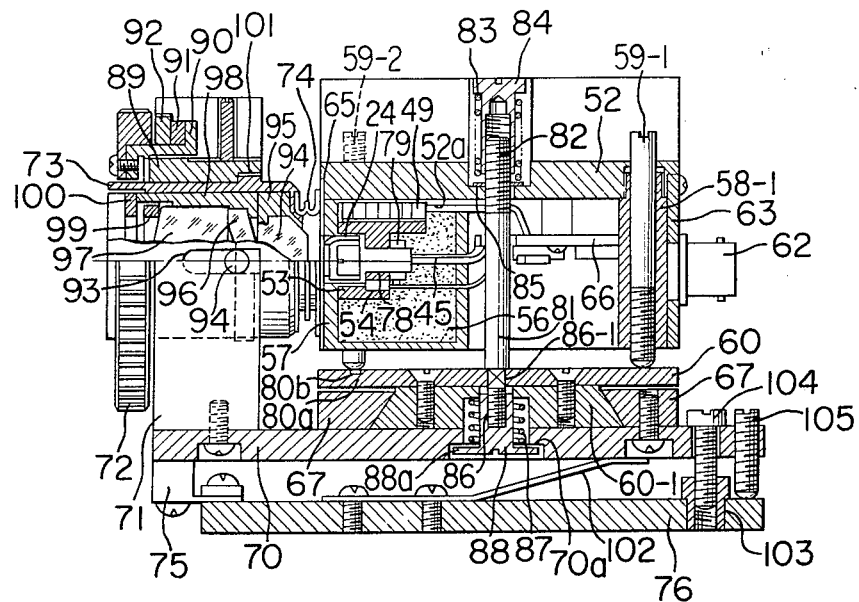

A portion represented by double-dotted chain line 56 is a heat insulation enclosing said cooling elements 49, cooling member 53, semi-conductor laser 24, thermister 54 etc. and composed for example of polyurethane resin or cork. In this manner it is made possible to reduce the thermal feedback from the radiator to the cooling member 53 and to improve the cooling effect of said cooling elements 49. FIGS. 7 and 8 show a laser unit composed of the device shown in FIG. 6 combined with other additional elements, wherein FIG. 7 is a perspective view thereof while FIG. 8 is a cross-sectional view along the line A—A in FIG. 7. As shown in FIG. 8, inside an insulating case 57 filled with said heat insulation 56, cooling elements 49 are provided between a face 52a of radiator 52 and a cooling member 53 holding a semi-conductor laser 24 and a thermister 54, said various elements being fixed by said heat insulation 56. On three places of said face 52a of radiator 52 there are downwards provided three cylindrical pillars 58-1–58-

3, which respectively engage, by means of female screws provided therein, with screw shafts 59-1–59-3, which support said radiator 52 above the surface of a base plate 60.

The space under said radiator 52 is enclosed by side plates 61, a rear plate 63 provided with a connector 62, and a front plate 65 provided with a beam emitting window 64. In said space enclosed by the radiator 52, insulating case 57, side plates 61 and rear plate 63 there is provided a control circuit board 66 for controlling the temperature, emission intensity and emitting time of said semi-conductor laser 24. Said base plate 60 is fixed on a moving plate 60-1 which is slidably supported between guide members 67 and performs linear sliding displacement in a direction perpendicular to the paper plane in FIG. 8 by means of adjust screws 69 engaging in screw holes provided in bridge members 68 provided between said guide members 67. Said guide members 67 are fixed on a base plate 70 on which there is provided a lens mounting member 71 supporting a helicoid adjust ring 72 and a condenser lens tube 73. There is also provide a flexible tube 74 composed of rubber, plastics etc. of which one end is connected to said front plate 65 while the other to said lens tube 73, and which separates the air in the vicinity of said semi-conductor laser 24 from the surrounding air thereby preventing dewing on the emitting surface of said laser 24 upon cooling thereof.

Said base plate 70 is connected, by means of a spring member 75, to a mounting plate 76 provided with mounting holes 77a, 77b for mounting said laser unit. Now the structure of said laser unit will be explained in further detail with reference to FIGS. 7 and 8. The semi-conductor laser 24 is inserted into a threaded opening 78 of cooling member 53 and fixed by means of a nut 79. The intensity and time of emission of said semi-conductor laser 24 are controlled by connecting said cooling member 53 and a lead wire 45 to the electric circuit on said circuit board 66. The thermister 54 is embedded in said cooling member 53 and transmits the information on the temperature in the vicinity of said laser 24 to said electric circuit through the lead wires 55a, 55b connected thereto.

The cooling elements 49 are maintained in close contact, on both sides thereof, with the radiator 52 and the cooling member 53 as aforementioned and perform heat generation or absorption by power supply to the lead wires 51a, 51b in response to the information from said thermister.

The control circuit provided on said circuit board 66 is connected to an external drive circuit through a connector 62 provided on said rear plate 63. The pointed tips of screw shafts 59-3 and 59-2 mounted on said radiator 52 respectively engage with an oblong groove 80b and a round recess 80a on the base plate 60 while the tip of screw shaft 59-1 is in contact with the surface of said base plate 60 so as to maintain said radiator 52 above the base plate 60. There is further provided a center shaft 81 of which a screwed portion 82 provided on one end thereof passes through larger holes provided on the circuit board 66 and on the radiator 52 and engages with a spring-holding screw 84 provided thereunder with a spring 83 of which pressing force maintains, through a washer 85, the radiator 52 in contrast pressure contact with said base plate 60. Said center shaft 81 is provided at the other end thereof with a square-sectioned portion 86-1 engaging with a square hole provided on the base plate 60 and a screwed portion passing through the moving plate 60-1 and base plate 70 and engaging with a spring-holding screw 88 provided thereabove with a spring 87, of which compression force, selected larger than that of the above-mentioned spring 83, biases the center shaft 81 toward said base plate 60. Said center shaft 81, being unrotatable with respect to the base plate 60 due to the engagement between said square hole thereof and said square-sectioned portion of center shaft, allows easy screwing of said screws 84, 88 thereinto. Also the displacement of center shaft 81 toward the base plate 60 by the spring 87 is limited at said square hole since the diameter of said square-sectioned portion 86-1 is selected smaller than that of the center shaft 81.

In the above-explained structure it is rendered possible to vertically shift the position of radiator 52, and therefore that of semi-conductor laser 24 attached thereto, with respect to the base plate 70, by rotating the screw shafts 59-1-59-3 by equal amounts. Also by rotating either one of said screw shafts 59-1-59-3, it is possible to rotate the radiator 52 around the tips of other non-rotated screw shafts, with respect to the base plate 70. This again allows a similar rotation of said semi-conductor laser 24 attached to said radiator 52. Also the moving plate 60-1 supported between two guide members 67 is slidably displaceable in a direction perpendicular to the beam emitting direction of said laser 24 in response to the displacement by rotation of adjust screws 69 provided on bridge members 68. Said displacement causes a similar displacement of said laser 24 mounted on said moving plate 60-1.

After the relative position of said laser 24 with respect to the base plate 70 is adjusted by the foregoing manner, the spring-holding screw 84 is screwed into the center shaft 81 until the end of said screw 84 becomes engaged with the washer 85. Upon further rotation of said screw 84, the shaft 81 is lifted against the function of spring 87 to cause eventual engagement of portion 88a of spring-holding screw 88 with a face 70a of the base plate 70 thereby integrally fixing said base plate 70 with the radiator 52.

Said base plate 70 is provided with a lens mounting member 71 of which central opening supports a slide helicoid ring 89 in a slidable manner and a screw helicoid ring 90 in a rotatable manner. Said helicoid rings are mutually engaged by screw engagement. Said screw helicoid ring 90 is maintained in said lens mounting member 71 by means of a spacer member 91 and a stop ring 92. Also there is provided an adjust ring 72 connected with said screw helicoid ring 90, and a rotation of said adjust ring 72 causes an axial sliding of the helicoid 89 as the rotation thereof is limited by a key groove 93 provided thereon and a guide pin 94 inserted into said groove. A front lens group 94 is supported by a metal element 95, while lenses 96, 97 constituting a rear lens group are supported by a metal element 98 and a stop ring 99, said metal elements 95 and 98 being supported by a lens tube 73 and stop ring 100. Said lens tube 73 engages with said slidable helicoid 89, and fixed by a screw portion 101. A collimating lens composed of lenses 94, 96 and 97 functions to form a parallel beam from the diverging beam emitted by said semi-conductor laser 24 and is provided with a larger number of aperture for example 0.5 or large enough for covering the diverging angle of the beam from said laser 24 and with a long working distance. The base plate 70 is connected with a front end of mounting plate 76 through a hinge member 75, a plate spring 102 provided on said mounting plate 76 provided a biasing force in anticlockwise direction to said base plate 70 around said hinge member 75. A bolt 104 passing through an opening provided in said base plate 70 and engaging with a screw member 103 provided on said mounting plate 76 performs to retain the anticlockwise rotation of said base plate 70 at a desired angular position, while a screw 105 is provided to lock the function of said bolt 104. Consequently the angle of base plate 70 with respect to the mounting plate 76 can be adjusted by rotating the screw 104, and said angle can be maintained by tightening the screw 105.

Beam Detecting Unit

As explained in the foregoing, a part of parallel beam emitted by the laser unit is guided to a beam detecting unit containing a half mirror 29. Said beam detecting unit is provided with a photoelectric converting element 38 for mounting the intensity of said beam and performing a control to maintain said intensity constant. However said photoelectric converting element 38 has a drawback of changing the sensitivity thereof according to the ambient temperature. The present apparatus, therefore, is provided with a heating device for maintaining the temperature around the photoelectric converting element constant. In the following there will be given a further detailed explanation on said beam detecting unit.

Figure 9:
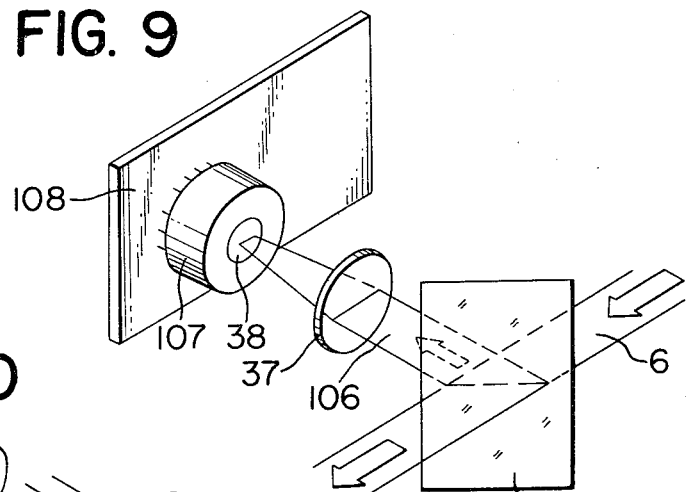

Referring to FIG. 9, the laser beam 6 emitted from the semi-conductor laser 24 through a lens 25 is partly reflected by a half mirror 29 to form a reflected beam 106, which is focused by a condenser lens 37 onto a photoelectric converting element 38 surrounded by a heating device 107 and fixed on a print circuit board 108.

Figure 10:
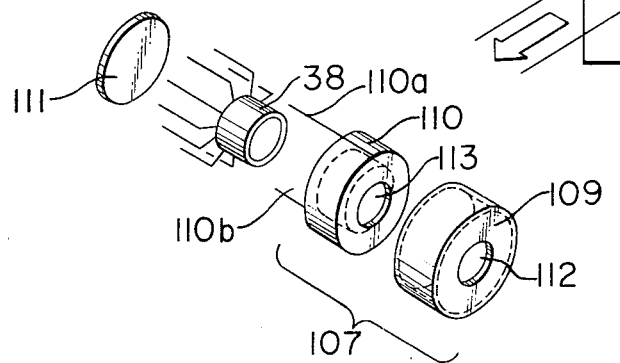
Figure 11A:
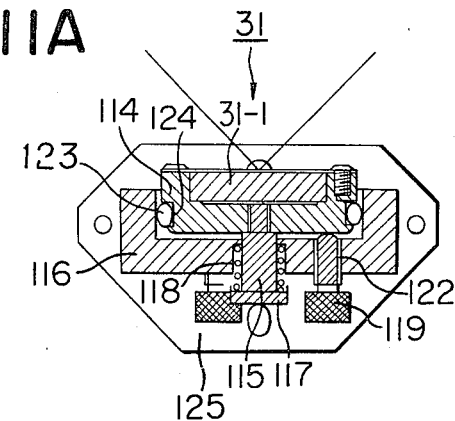
FIG. 11A is a planar view of a mirror unit.
Figure 11B:
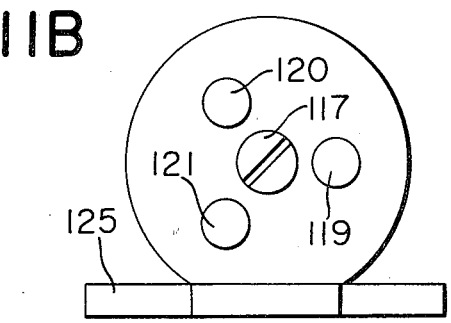
FIG. 11B is a rear view thereof.

FIG. 10 is an exploded perspective view of said photoelectric converting element 38 and heating device 107 wherein 109 is a cover, 110 a heating element and 111 a bottom plate.

Said converting element 38 is inserted into said heating element 110 which is in turn inserted into said cover 109, and the composite is covered with said bottom plate 111 while the lead wires of said converting element 38 are folded as illustrated.

Said cover 109 and heating element 110 are respectively provided with central openings 112, 113 to allow introduction of said reflected beam into the photoelectric converting element 38.

Consequently the characteristics of said converting element 38 can be maintained constant by feeding a current to the terminals 110a, 110b of said heating element 110 in such a manner as to maintain said converting element 38 at a constant temperature.

Reflector Unit

In the following there will be given an explanation on the structure of the reflector unit while referring to FIGS. 11A, 11B, 12A and 12B, which respectively are a cross-sectional view and a rear view of said reflector unit, a plan view and an exploded rear view of the mirror unit mounted on a movable support. In said reflector unit a mirror 31-1 is fixed on a mirror fixing ring 114 provided with a mount shaft 115 which is loosely fitted through a mirror support ring 116 and is provided with an end portion 117 supporting a compression spring 118 between said end portion and said support ring 116. 119, 120 and 121 are adjust screws for supporting said mirror support ring 114 on three points thereof against the force of said compression spring 118, said screws being screwed into rock inserts 122 fitted into said mirror support ring 116 as illustrated so as to protrude from said support ring 116 by adjustable amounts thereby allowing to arbitrarily adjust the inclination of said mirror with respect to said support ring 116. Said adjust screws 119-121 are preferably provided with approximately spherical tips. The use of rock inserts 122 for said adjust screws 119-121 allows to prevent rocking or slackening of screws resulting from play in the threads of adjust screws 119-121. Although micrometer heads have been used for such adjust screws, the use thereof for small adjusting means is difficult due to the cost and dimension of such micrometer heads.

Also commercially available screws, if without rock inserts, require wrapping treatment in order to prevent play in the threads.

In a three-point support means as explained above, the mirror fixing ring 114 may slide along a plane passing through the tips of three adjust screws 119-121. In order to avoid such sliding there is provided an O-ring 123 between the mirror fixing ring 114 and mirror support ring 116 in the illustrated manner, said O-ring being preferably fitted into a groove 124 provided around the mirror fixing ring 114 in order to prevent detachment therefrom at the adjustment.

The above-mentioned structure allows the tiltage of the mirror 31 in an arbitrary direction with respect to the support ring 116 of independently adjustment the screws 191-121 against the pressure of compression spring 118 and also allows, once the adjustment completed, the mutual positional relationship between the tips of adjust screws and the rear face of mirror fixing ring being maintained in a nearly locked state.

Said mirror support ring 116 is fixed on a mirror base plate 125 to constitute the reflector unit.

Figure 12A:
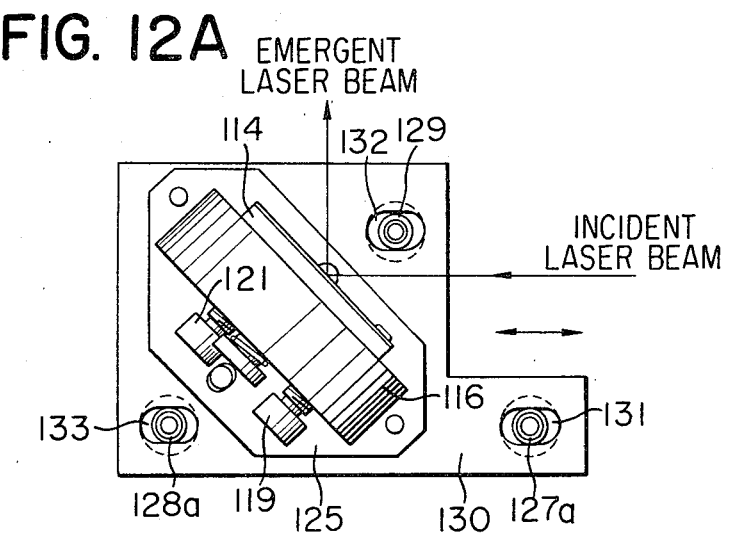
FIG. 12A is a planar view of said mirror unit mounted on a support.
Figure 12B:
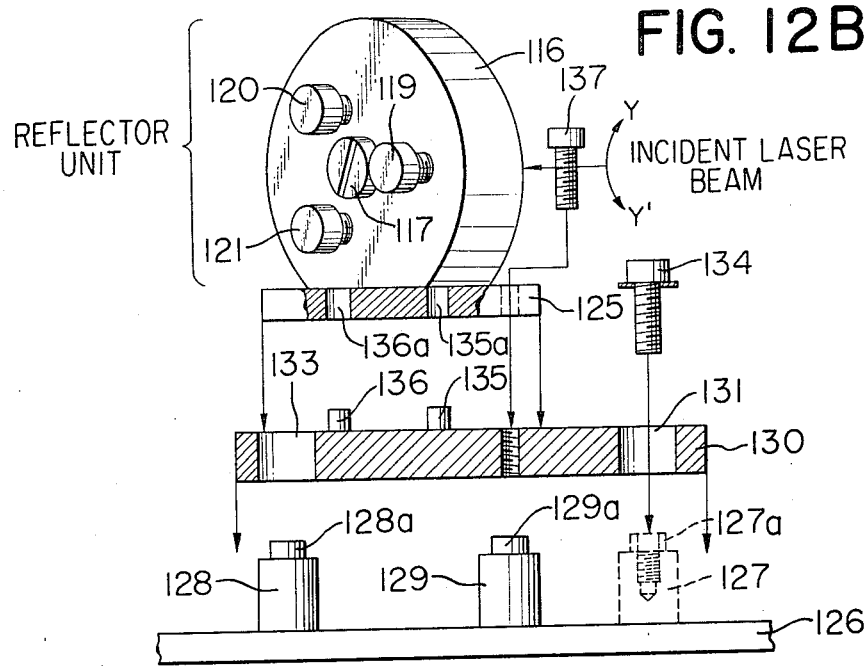
FIG. 12B is a lateral view of said mirror unit mounted on a support.

Referring to FIGS. 12A and 12B, on an optical base plate 126 there are provided spacers 129, 127, 128 of a shape as illustrated, of which flange surface support a movable support 130 provided with oblong holes 131-133 corresponding to the positions of said spacers 127-129 and engaging with guide portions 127a, 128a, 129a thereof whereby said movable support being movable only in the incident direction X-X' of laser beam and being fixable at an arbitrary position by means of three screws 134 (those corresponding to guide portions 129a and 128a not shown). On said horizontally movable support 130 there are provided two positioning pins 135, 136 while said mirror base plate 125 is provided with a circular hole 135a and an oblong hole 136a in corresponding positions, so that said reflector unit is placed at a determined position with respect to said movable support by inserting said positioning pins 135, 136 respectively into said circular and oblong holes 135a, 136a and fixed at said position by means of screws 137. The above-explained structure allows the mirror 31-1 to be displaced in the X-X'direction and be tilted in an arbitrary direction and thus enables, in combination with the adjust mechanism for said semi-conductor laser and objective lens in the Y-Y' direction perpendicular to said X-X' direction, to introduce the laser beam along the optical axis of cylindrical beam expander to be explained later. Moreover said structure allows an easy adjustment and assures a securely locked state once the adjustment is completed.

Also the use of positioning pins 135, 136 eliminates the necessity for readjustment in case the reflector unit 31 is detached from and then again mounted on the optical casing for example for cleaning or replacement of mirror 31.

Beam Expander Unit

Figure 13A:
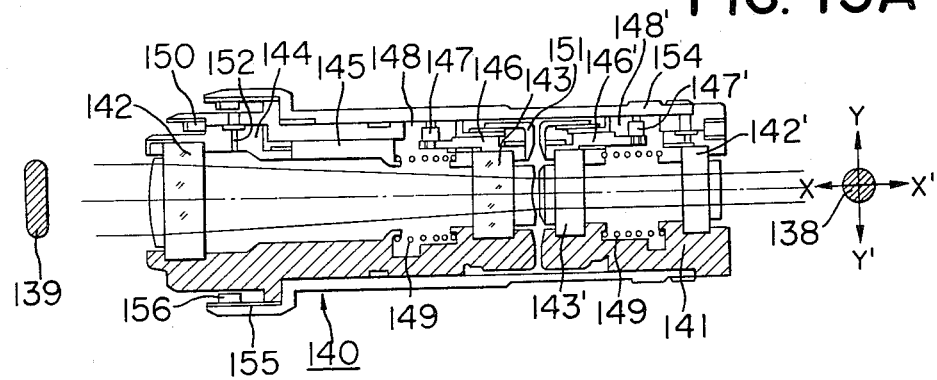
Figure 13B:
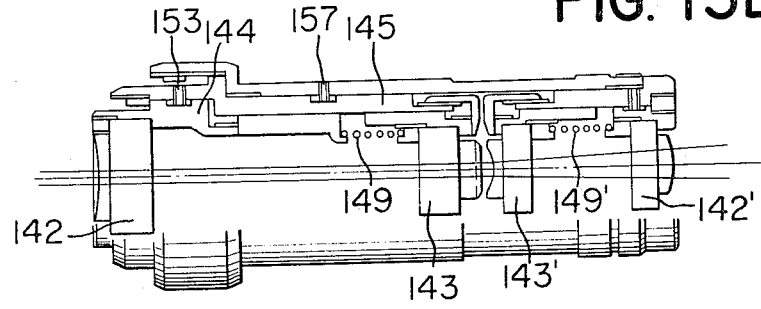

Now reference is made to FIGS. 13A, 13B showing the beam expander unit respectively in a cross-sectional view and a partially cut-off lateral view seen from the direction of arrow B. Said beam expander is inserted in order to convert the laser beam of a beam pattern as shown by 138 emergent from the objective lens 25 into a laser beam of a pattern as shown in 139 adapted to be focused as a spot onto the photosensitive member or drum. In this embodiment there is employed a combination of two cylindrical beam expanders for reducing the X-axis and expanding the Y-axis of the beam pattern of incident parallel laser beam. A beam expander 140 functions to reduce the X-axis while an another beam expander 141 functions to expand the Y-axis. As said beam expanders are of similar internal structures, the following description will refer to the expander 140 for the purpose of simplicity.

The beam expander 140 is to be provided with a collimating mechanism and an air gap adjusting mechanism for the lenses 142 and 143, and in this embodiment these functions are achieved by means of a simple lens tube structure. A lens fixing ring 144 for the lens 142 is fitted into a lens tube 145 and is rendered rotatable around the optical axis. Also a fixing ring 146 for the lens 143 is fitted into said lens tube 145 and is provided with a guide pin 147 engaging with an oblong groove 148 provided on the lens tube 145 so as only to allow linear displacement along the optical axis.

Said fixing rings 144, 146 are biased by a compression spring 149 and supported in position by contact with a stop ring 150 and an advance ring 151. The lens 143 is linearly displaceable along the optical axis by said advance ring 151 to achieve air gap adjustment in relation to the lens 142, which can be collimated with said lens 143 by a rotation around the optical axis, said rotation being achievable by means of a pin inserted into a hole 152 provided on said fixing ring 144 and can be locked at an optimum position by means of a lock screw 153. These adjustments are achieved for each unit by introducing the laser beam and observing the emergent beam pattern. The beam expander 141 is provided with a similar internal structure, wherein corresponding components are represented by corresponding primed numbers. Upon completion of adjustments, the beam expanders 140, 141 are assembled into a lens tube 154. The beam expander 141 is fixed in said lens tube 154 by screwing thereinto, while the expander 140 is fitted thereinto in a state rotatable around the optical axis by means of a spacer 156 and a stop ring 155, then rotated so as to bring said expanders 140, 141 in a mutually perpendicular relationship and fixed in said position by a lock screw 157.

Lens Unit

In the following given is a detailed explanation on the lens unit composed of said beam expander unit and an arcsine imaging lens 35 both mounted on a support.

Figure 14:
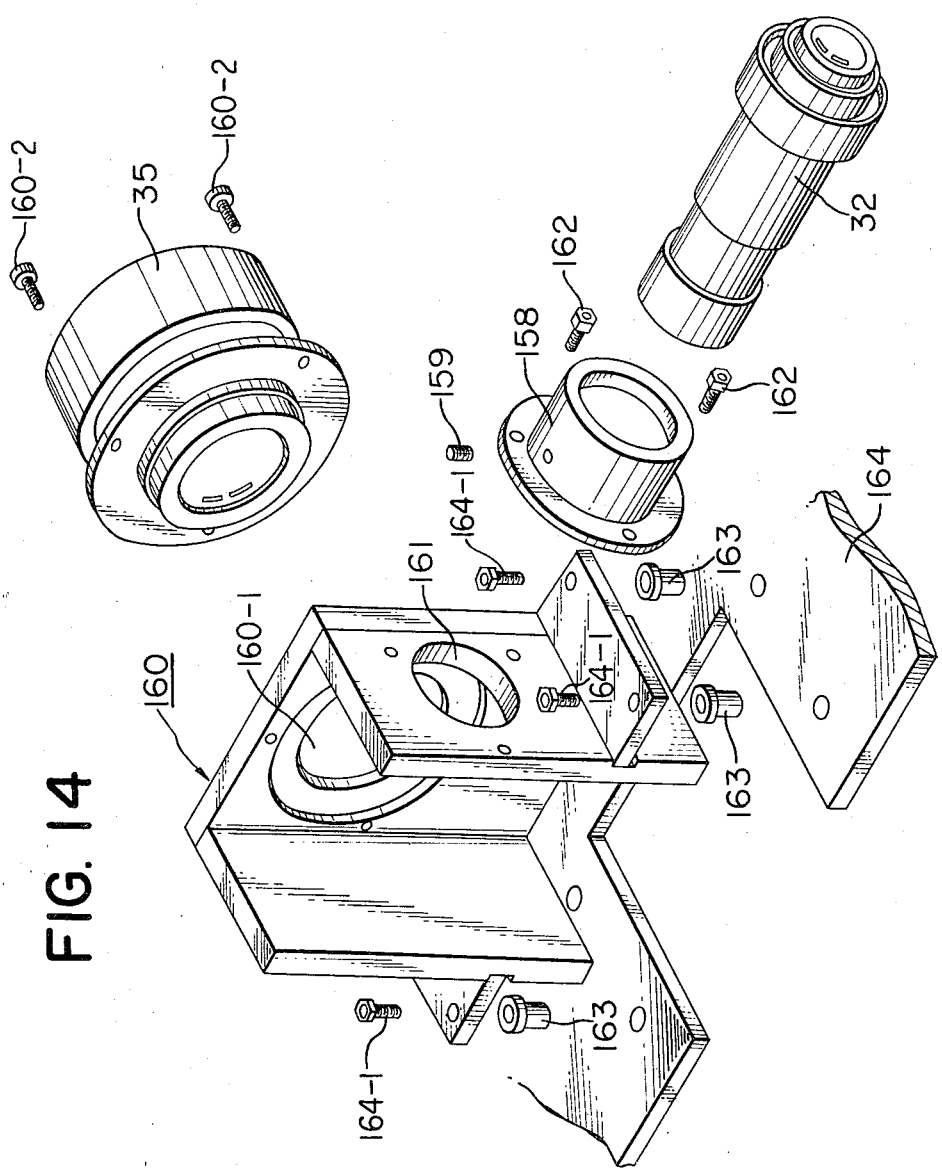
FIG. 14 is an exploded perspective view of a lens unit.

Referring to FIG. 14, the above-mentioned beam expander unit 32 after adjustment is pressed into a unit support ring 158 engaging the external periphery of lens tube, then rotated around the optical axis so as that the emergent beam from said expander unit gives a desired beam pattern and fixed at an optimum position by a lock screw 159. Said support ring 158 is inserted into an opening 161 provided on a support 160 and fixed by screws 162. Said support 160 is provided for supporting the beam expander unit, galvanomirror unit and arcsine imaging lens 35, and is designed and precision machined in such a manner that the optical axes of the beam expander unit and the arcsine imaging lens 35 mutually cross at a point coinciding with the reflecting point of the galvanomirror unit and passing through the rotating axis of said galvanomirror perpendicular to said two optical axes. Similar to the above-explained connection between said support 160 and beam expander unit, the arcsine imaging lens 35 is inserted into an opening 160-1 and fixed by screws 160-2. The above-described structure eliminates the collimating procedure between the beam expander unit, galvanomirror unit and arcsine imaging lens 35 thereby reducing the work required for the optical adjustment. Said support 160 is mounted on the optical base plate 164 by means of screws 164-1 through damping members 163 in order to avoid undesirable effect of external vibration to the galvanomirror unit.

Arcsine Imaging Lens

The arcsine imaging lens is an imaging lens provided with distortion characteristics represented by the following equation:

$$Y = 2\phi_0 f \sin^{-1}(\theta/2\phi_0)$$

wherein:
Y: image height
f: focal length of imaging lens
$\theta$: angle between the scanning beam toward the inlet nodal point of imaging lens and the optical axis of imaging lens
$\phi_0$: maximum vibrating angle of galvanomirror and is employed to achieve a constant-speed scanning on the focal plane by the focused spot in case of a scanning with a parallel beam and a galvanomirror as in the present embodiment. Details of such lens is disclosed in the Japanese Patent Application No. Sho50-0440 in the name of the assignee of the present application.

Galvanomirror Scanning Unit

Figure 15:
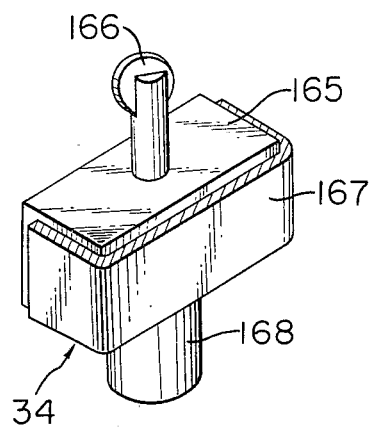
FIG. 15 is a perspective view of a galvano-mirror.
Figure 16:
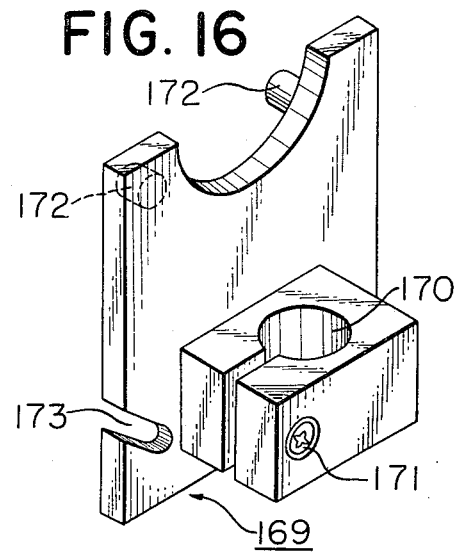
FIG. 16 is a perspective view of a mount for said mirror.

In the following there will be explained, with reference to FIGS. 15–20, the galvanomirror scanning unit provided at the crossing point of the optical axes of said beam expander unit 32 and imaging lens 35. Referring to FIG. 15 illustrating said scanning unit in a perspective view there are shown a main body 165, a mirror 166, a rubber heater 167 and a mounting portion 168 of which the central axis is located on the reflecting surface of said miror 166 and on the rotary axis thereof.

Figure 17:
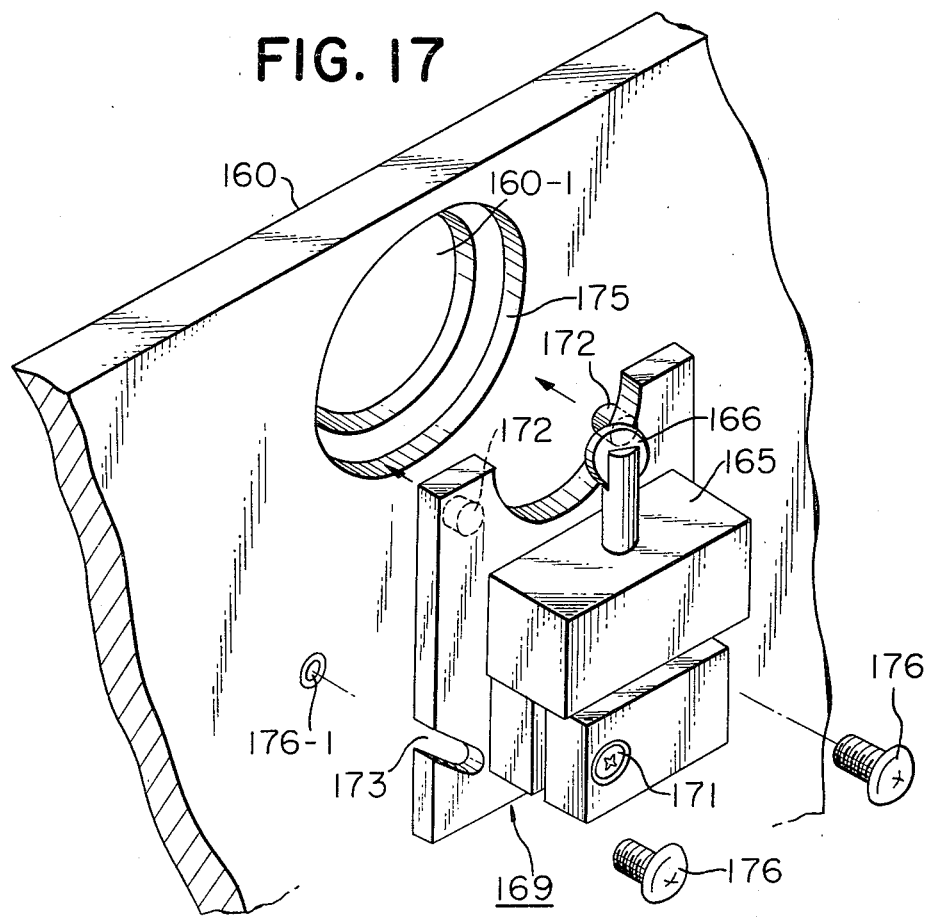
FIG. 17 is an exploded perspective view showing the mounting of said galvano-mirror.
Figure 18:
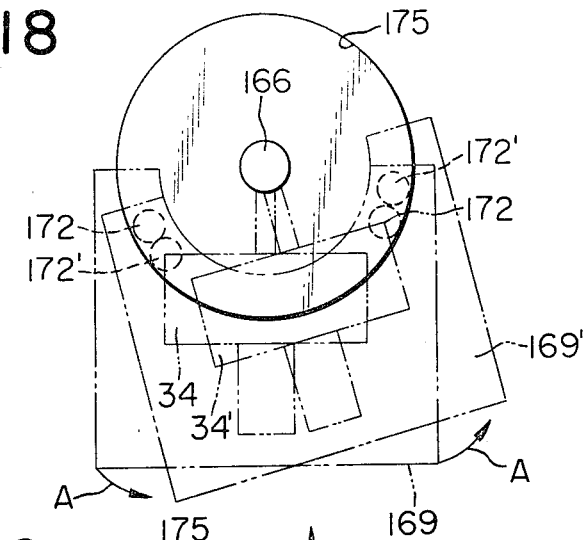
FIG. 18 is an explanatory drawing showing said mounting.

FIG. 17 shows a mount 169 for said galvanomirror scanning unit of which an opening 170 is adapted to accommodate said mounting portion 168 of said scanning unit and fixing the same by means of a screw 171. 172 is a guide pin functioning as a guide in case of adjusting the position of said scanning unit as will be explained later, and 173 is an oblong opening for fixing said mount.

FIG. 17 is a perspective view showing the way of mounting the galvanomirror unit 34 to the mount 169 and further to the fixed mount 160, wherein the positioning is conducted in such a manner that the guide pin 172 comes in contact with the rim of opening 175 and the mirror 166 becomes located in the center of said opening 175. In this manner the mount 169 is rotatable around the center of said opening 175 and may be fixed to the fixed mount 160 by inserting screws 176 into said oblong openings 173 and screwing into the corresponding holes 176-1.

In the above-explained structure, a displacement of guide pins 172 along the rim of opening 175 to the positions 172' causes the mount 169 and the galvanomirror scanning unit made integral therewith to rotate around the center of opening 175. In this case if the reflecting point of the laser beam on the mirror 166 coincides with the center of said opening 175, the scanning unit 34 can be displaced or tilted to a position 34' without causing the displacement in the reflecting point of the laser beam.

Figure 19:
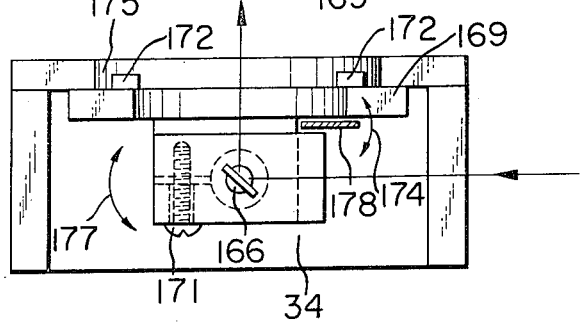

Also FIG. 19 shows a structure for positional adjustment by rotating the scanning unit around the rotating axis thereof.

Figure 20:
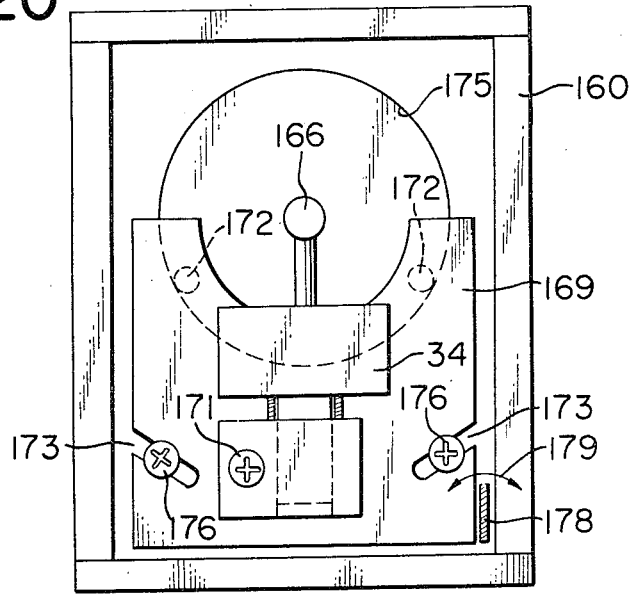

The galvanomirror scanner 34 mounted on a hole 170 provided in the mount 169 is freely rotatable in the direction of arrow when the screw 171 is loose, and is fixed in position thereby after the determination of direction. Such rotation of said scanner 34 can be achieved by inserting a screw driver 178 into a gap between said mount 178 and scanner unit 34 and rotating said screw driver as indicated by arrow 174. Also as shown in FIG. 20, the position of the galvanomirror scanner can be slightly changed by inserting a screw driver 178 between the fixed mount 160 and mount 169 and twisting said screw driver as indicated by the arrow 179 (FIG. 20). Upon completion of adjustment the position can be fixed by tightening two screws 176.

Such adjust mechanism is structurally simple and still allows an adjustment of tilting in the order of 30 minutes to 1 degree without requiring any special tools and without displacing the reflecting point of the laser beam even when the mirror position is changed.

Mirror Unit

Figure 21:
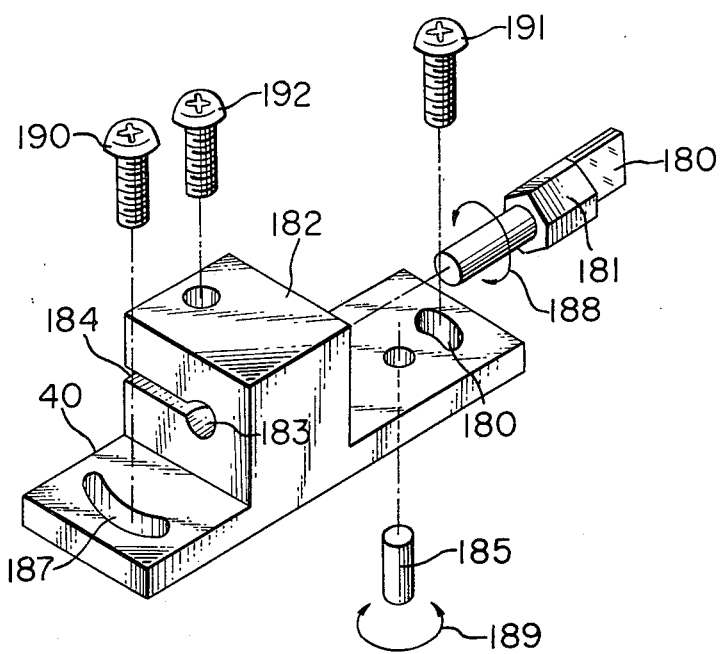
Figure 22:
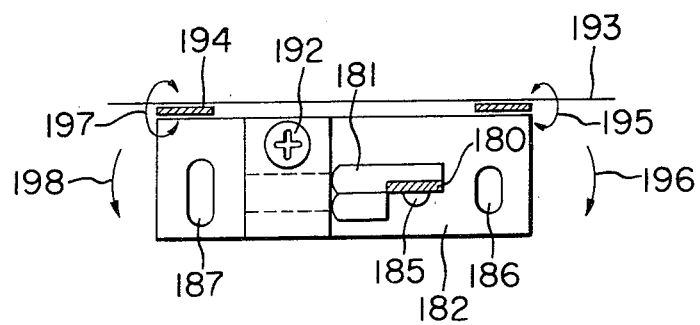

FIGS. 21 and 22 show a mirror unit comprising a mirror 40, wherein 180 is a mirror piece adhered to a holder rod 181 made of a hexagonal drawn rod, which is also provided with a cylindrical portion for engaging with a base member 182 provided with a hole 183 for holding said holder shaft. A slot 184 is provided which connects with said hole 183. Also the base member 182 is provided with a pin 185 with an axis which is perpendicular to the central axis of said hole 183. Further said base member 182 is provided with oblong holes 186 and 187 for mounting said base member, said holes being formed in an arc with the center of curvature thereof at said pin 185.

In the mirror unit of the above-mentioned structure, if the reflecting point of the laser beam on the mirror piece 180 is located at the crossing point of the central axes of hole 183 and of pin 185, said reflecting point remains at the same position even when the holder rod 182 is rotated in a direction 188 to change the direction of mirror or when the base member is rotated in a direction 189. Also once the adjustment is completed, secure positioning can be assured by tightening the screws 190-192.

The adjustment of the direction of the mirror can be achieved with the above-mentioned mirror unit in the following manner.

At first the screw 192 is loosened to allow free rotation of the holder rod 181, which is then clamped, at the hexagonal portion thereof, with a small wrench and rotated to a desired position. Successively the screw 192 is again tightened to fix the holder rod 181 in position.

Then the screws 190, 191 are loosened to allow free rotation of the base member 182 around the pin 185. A screw driver 194 is inserted between the base member 182 and a wall or a projection 193 provided in the vicinity thereof, and the base member 182 can be rotated around the pin 185 in a direction of arrow 196 or 198 by rotating said screw driver in a direction 195 or 197, respectively. In this manner a fine adjustment of 30'-1° can be achieved with a very simple structure. After the base member 182 is turned to a desired direction, the screws 190, 191 are tightened to fix the base member 182.

Now there will be given an explanation on the control section of the present apparatus.

The present apparatus is featured by the use of an endless photosensitive drum, and a pulse generating device for generating pulses of a determined interval corresponding to the rotation of said photosensitive drum, the control of each cycle being performed by said pulses and a counter device cooperating therewith. For example said pulse generating device is designed to generate 15.75 pulses for each rotation of the drum. In this manner, upon counting of 16 pulses by said counter, the drum performs a full rotation or a rotation a little in excess thereof. Such rotation avoids the presence of an untreated portion in the pre- or post-treatment of the photosensitive drum to be conducted in a manner to be explained later before or after each copying cycle, thus enabling the start of a copying process from an arbitrary position of the photosensitive member making use of the advantage of the endless drum.

Also the present apparatus is provided with certain units constantly receiving a power supply as long as the apparatus is connected to an electric power source even when the power switch is turned off, thereby allowing to prompt starting of the recording function after the power switch is turned on. Such units constantly receiving power supply are as follows:

1. Semi-conductor laser temperature control circuit (included in a semi-conductor laser control circuit 199 shown in FIG. 23):

Said temperature control circuit drives the cooling elements 49 to maintain constant the temperature of cooling member 53 of the semi-conductor laser 24 in response to the temperature detection signal from the thermister 54 mounted on the radiator 52. Through heating or cooling by the cooling elements 49 to maintain the temperature of cooling member 53 constant, it is rendered possible to achieve a constant operating temperature of the semi-conductor laser 24, thus avoiding fluctuation of laser output resulting from temperature change and making it possible to obtain a hard copy output with reduced image density fluctuation.

2. Galvanomirror temperature control circuit (included in the galvanomirror control circuit 200 shown in FIG. 23):

Said temperature control circuit 200 drives a temperature control means such as a rubber heater, mounted on the galvanomirror itself, to maintain said galvanomirror at a constant temperature in response to a detection signal from a temperature detecting means such as a thermister mounted on the galvanomirror itself.

Such control to maintain a constant temperature of the galvanomirror avoids the drift of mechanical resonance frequency by temperature change in a mechanical resonance type galvanomirror, and thus avoids the drift of the scanning speed of the recording beam on the photosensitive drum resulting from the temperature change, allowing to realize a constant pitch of the recording beam in the auxiliary scanning direction (rotational direction of the photosensitive drum) and thus to obtain a hard copy output of an improved quality.

In the following there will given a detailed explanation on the sequence of the present apparatus, while making reference to FIGS. 23 and 24 which respectively are a control block diagram and a timing chart of the present apparatus.

Figure 23:
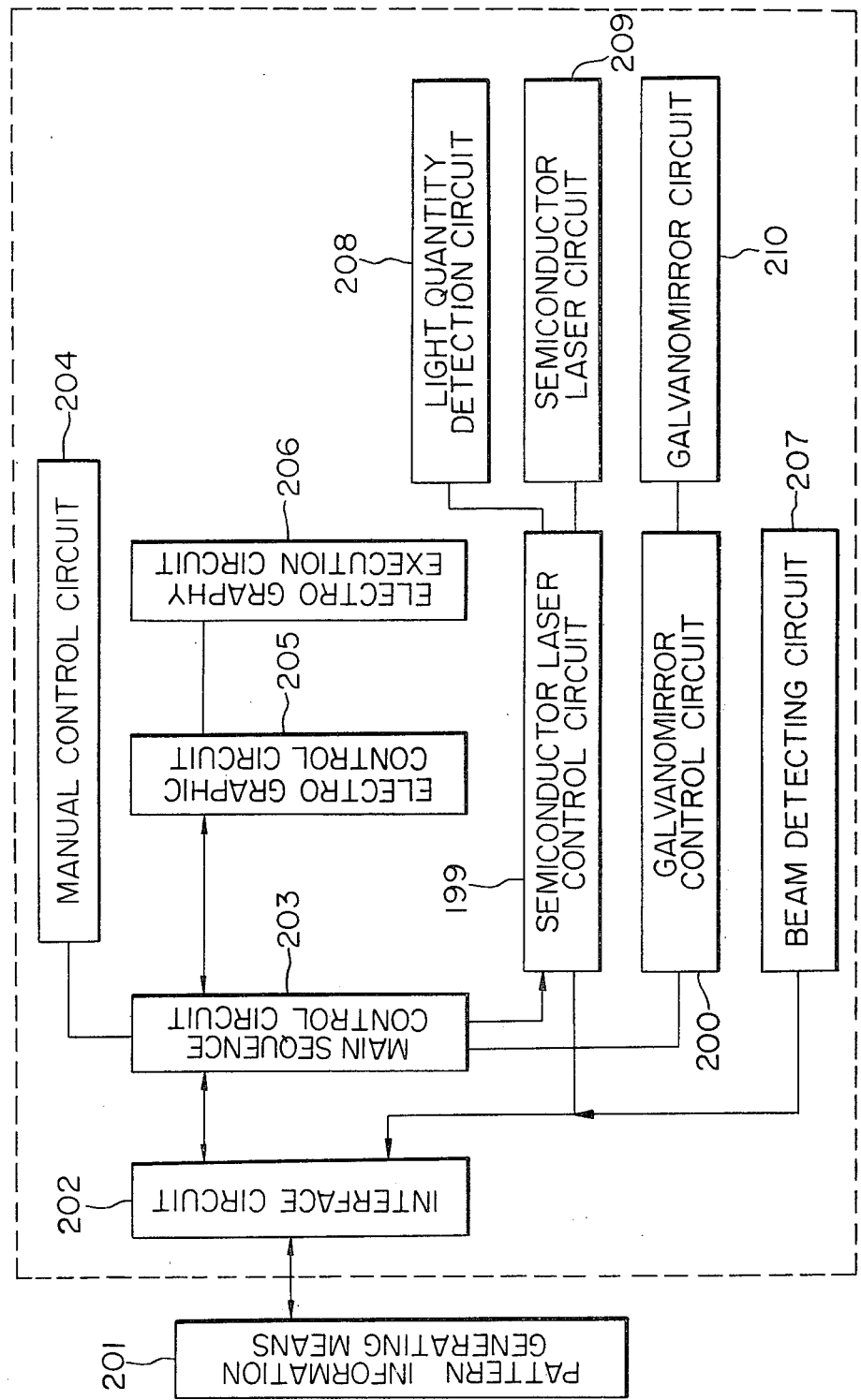
FIG. 23 is a block diagram of a control circuit for the recording apparatus of the present invention.
Figure 24B:
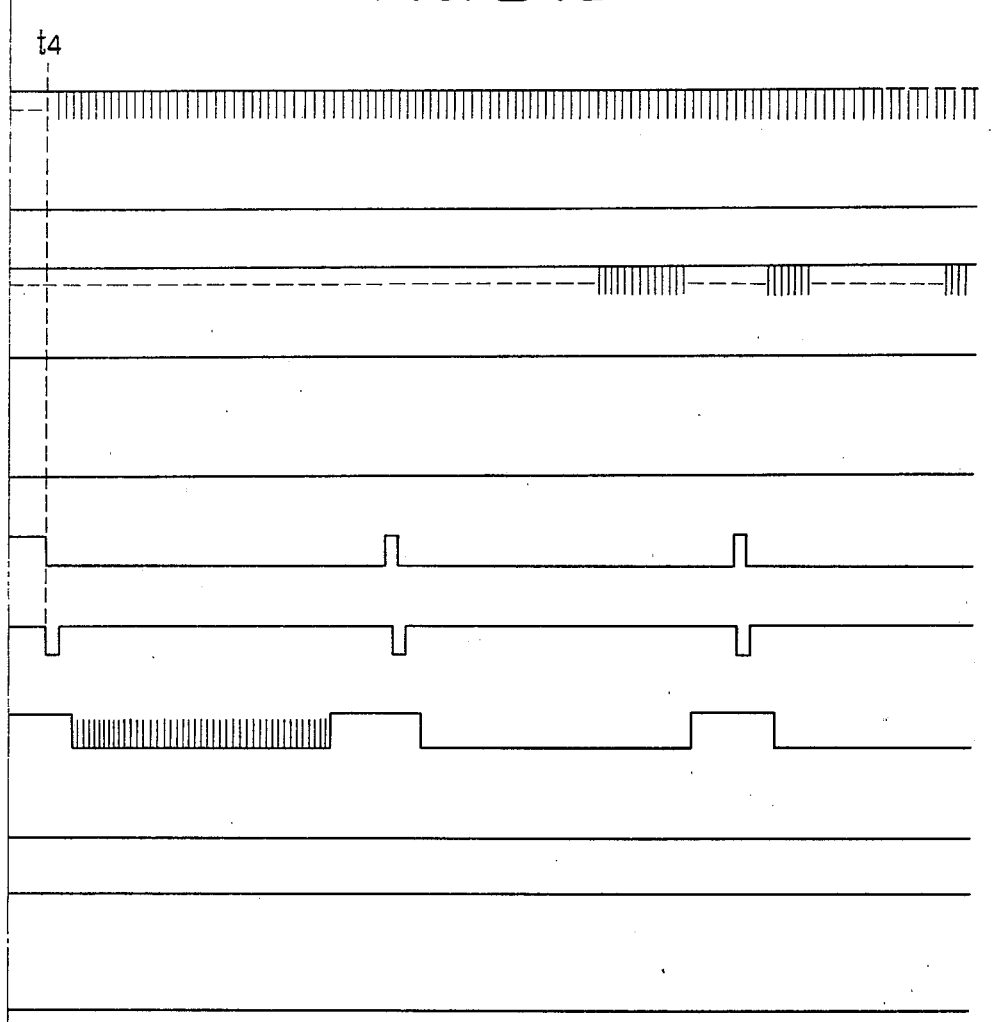
FIGS. 24, 24A and 24B are wave-form charts for explaining the functions of said recording apparatus shown in FIG. 23.
Figure 24:
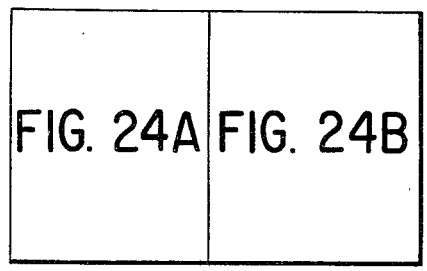
Figure 24A:
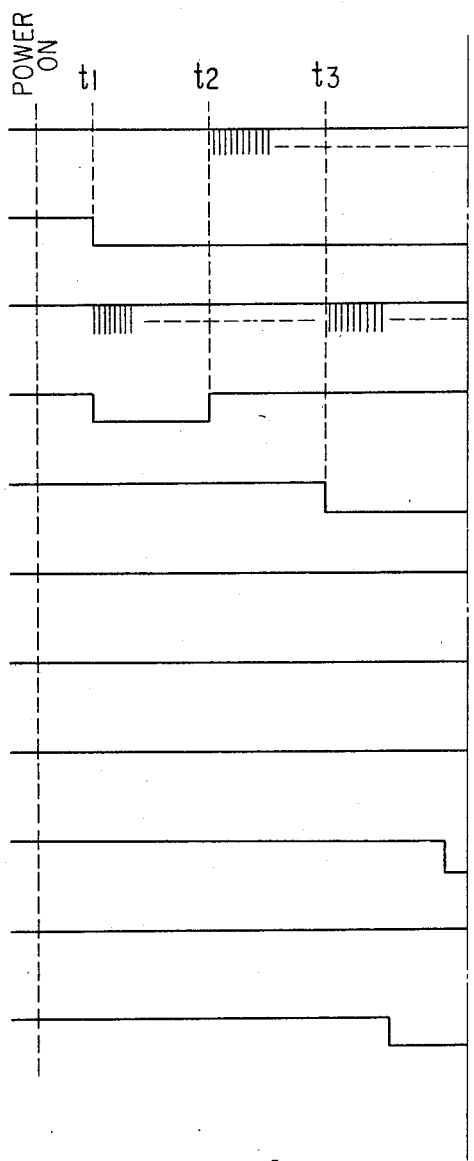

As shown in FIG. 23, the control system of the present apparatus is composed of an interface circuit 202 for receiving image information and control signals from an image information generating device 2-1 such as a magnetic tape or a semi-conductor memory storing an image information transferred from a magnetic tape, an electrophotographic process control circuit 205, an electrophotographic process executing circuit 206, the foregoing circuits being for example those disclosed in the U.S. Pat. No. 4,059,833 and not being therefore explained in detail, a semi-conductor laser control circuit 199, a galvanomirror control circuit 200, a beam detecting circuit 207, a light intensity detecting circuit 208, a semi-conductor laser circuit 209, and a galvanomirror circuit 210. Upon transmission of a power on signal, at a timing t1 shown in FIG. 24(B), from the image information generating device 201 through the interface circuit 202 to a main sequence control circuit 203, there are initiated the functions of circuits other than the aforementioned semi-conductor laser temperature control circuit and galvanomirror temperature control circuit which are already in function. Simultaneously with the switching on of the semi-conductor laser 24 in the laser circuit 209, the galvanomirror scanner 34 of the galvanomirror circuit 210 is switched on to initiate the laser beam scanning on the photosensitive drum 4. Upon entry of the laser beam into the photoelectric converting element 42 provided in a position shown in FIG. 4, the beam detecting circuit 207 releases beam detection signals as shown in FIG. 24(C) which are transmitted to the image information generating device 201 through the interface circuit 202 which is provided to perform signal interfacing between said image information generating device 201 and the control circuit of the present apparatus. Thus the present apparatus can be connected to any image information generating device of any interfacing condition by simply changing the interface circuit 201.

Because of the use of digital circuits in the recording apparatus, the controller thereof is reset at a time t2 as shown in FIG. 24(D). After said resetting the main sequence control circuit 203 consisting of digital elements supplies a photosensitive drum drive signal to the electrophotographic process control circuit 205 at a time t3 as shown in FIG. 24(E). Upon receipt of said signal the electrophotographic process control circuit 205 switches on a drum drive motor included in the electrophotograhic process executing circuit 206 to initiate the rotation of photosensitive drum 4. Thereafter the control circuit 205 controls various units, to be explained later, of the executing circuit 206 according to the control signals from the main sequence control circuit 203.

As explained in the foregoing there is provided, in a part of the drive system, a clock pulse generator for generating approximately 16 clock pulses for each rotation of the photosensitive drum, said pulses being utilized as the standard clock pulses for main sequence control. After the start of drive, the photosensitive drum 4 at first performs a full or approximately full rotation corresponding to 16 clock pulses (hereinafter represented as 16 CP). This rotation can be considered as a pre-treatment conducted before the print process in order to obtain a copy of a satisfactory quality therein, and may be dispensed with in certain cases. If, upon completion or rotation corresponding to 16 CP, the photosensitive drum drive signal shown in FIG. 24(E) is not supplied from the image information generating device 201 through the interface circuit 202 to the main sequence control circuit 203, which thereupon counts a further 16 clock pulses and turns off the photosensitive drum drive signal to terminate the rotation of drum 4. This step is a post-treatment conducted after the completion of the print process in order to obtain a copy of a satisfactory quality upon reentry into the print process, and may be dispensed with in certain cases.

On the other hand, if the aforementioned drum drive signal and a printer start signal are received, there is initiated the print process in the following manner.

Upon receipt of said printer start signal and photosensitive drum drive signal the photosensitive drum 4 is rotated corresponding to 16 CP plus 4 CP, and upon counting of said 20 CP by an unrepresented counter a top signal is transmitted at a time t4 shown in FIG. 24(G) from the main sequence control circuit 203 through the interface circuit 202 to the image information generating device 201, which then transmits the recorded signals such as the image information through the interface circuit 202 to the main sequence control circuit 203, maintaining the synchronization in the beam scanning direction or in the horizontal direction (synchronization in the main scanning direction) and also the synchronization in the direction of drum rotation or in the vertical direction (synchronization in the auxiliary scanning direction). Upon receipt of said record signals at a timing shown by FIG. 24(H), the main sequence control circuit 203 transmits said signals to the semi-conductor laser control circuit 199 which accordingly modulates the current to the semi-conductor laser 24. The laser beam thus modulated is guided through the mirror of galvanoscanner to the photosensitive drum to initiate the information recording thereon.

The peripheral surface of said photosensitive drum 4, consisting of a photosensitive layer covered with a transparent insulating layer, is at first positively charged by means of a corona current from a first corona charger 5 receiving a positive high voltage from a high voltage source, then is exposed in an exposure section to the modulated laser beam in scanning motion by the galvanomirror, simultaneously with an AC charging by an AC corona discharger 7 receiving an AC high voltage from a high voltage source, and is then subjected to a flush exposure by a flush exposure lamp 8 to form an electrostatic latent image of an elevated contrast on said surface to be processed in the succeeding developing step. The above-mentioned high voltage sources and the flush exposure lamp 8 are already placed in function by the control signal from the main sequence control circuit upon completion of resetting of the controller section. The developing device 9 to be used in the developing step is composed of a container 9-2 accommodating a liquid developer 9-1, a pump 9-3 for stirring and feeding the liquid developer to the developing electrode, and an electrode roller 9-4 electrically grounded and rotated in a close proximity of the drum to remove eventual fog in the visible image formed on the drum. The developing electrode 9-4 is constantly maintained at a determined distance from the photosensitive drum 4. Thus the electrostatic latent image formed on said photosensitive drum 4 is developed and rendered visible by the toner particles contained in the liquid developer supplied onto said developing electrode by the pump 9-3.

Successively the excessive developer present on the photosensitive drum 4 is squeezed off without deteriorating the image by means of a charging by a precharger 10 receiving a positive high voltage from a high voltage source. Then a transfer sheet 11 supplied from a paper feed section is brought into contact with the drum 4, whereby the image thereon is transferred to said tranfer sheet by means of a negative high potential field generated by a transfer charger 12 of a high voltage. After the transfer, the transfer sheet 11 is separated by a separating belt 18 and guided to a drying fixer 13. The photosensitive drum 4 is cleaned by a blade cleaner 14 for removing the excessive liquid developer and thus prepared for the next cycle. The liquid developer removed by the blade cleaner is guided, through the grooves provided on both ends of photosensitive drum 4 to the developing device 9 for reuse.

Now it will be explained why the print process is initiated after rotation of photosensitive drum corresponding to 16 CP plus 4 CP after the switching on of the power supply. It is to be noted that the present apparatus employs an endless type photosensitive drum of which entire periphery thereof can be utilized for image formation.

In order to increase the number of copies per unit time by avoiding unnecessary rotation so far as possible, the first rotation corresponding to 16 CP is required to clean the drum prior to the image formation as toner particles may remain on the blade cleaner and on the drum and may be solidified in worst case in case the apparatus has remained out of use for days.

The succeeding rotation corresponding to 4 CP is conducted in order to avoid, at the positive charging step preceding the slit exposure in the above-explained print process, the portion which has been in contact with said blade cleaner in order to improve the process reliability for the first copy.

Now there will be explained in detail the function of the paper feeding section. The transfer sheets 11 are accommodated in a cassette 11-1 which is detachably mounted in the paper feeding section at the lower left portion of the apparatus. Plural cassettes are prepared corresponding to plural sizes of transfer sheet and are easily exchangeable when required. The tranfer sheets 11 are placed, in said cassette 11-1, on a plate 11-2 biased upwards by a spring 11-3 so as to maintain said transfer sheets 11 constantly in pressure contact with separating claws provided on both leading ends of said cassette 11-1. By suitably selecting the spring constant of said spring 11-3, the transfer sheets 11 are maintained in contact with a paper feed roller 15 with an approximately constant pressure regardless of the quantity of transfer sheets 11 present in the cassette 11-1.

During the print process, and upon arrival of the photosensitive drum 4 at a predetermined position, the main sequence control circut 203 transmits a paper feed signal to the electrophotographic process control circuit 205, said paper feed signal being controlled by a paper feed signal released by the image information generating device 201. More specifically, the main sequence control circuit 203 supplied a paper feed signal to said electrophotographic process control circuit 205 to instruct the paper feeding operation by the paper feed section if a paper feed signal is received from the image information generating device 201 through the interface circuit 202 at the release of said top signal (vertical synchronization signal), and, if said paper feed signal is not received, forbids the supply of paper feed signal to the electrophotographic process control circuit 205. Said paper feed signal is maintain in ON state during the normal use of the apparatus but if turned OFF at the maintenance of said image information generating device 201 thereby preventing unnecessary feeding of transfer sheets.

In the following explained is there will now be a means for releasing a paper feed signal in response to the detection signal from the main sequence control circuit 203 informing the arrival of the photosensitive drum 4 at a predetermined position. If the aforementioned paper feed signal is transmitted to the main sequence control circuit 203 at the release of the top signal, the main sequence control circuit 203 detects the arrival of drum 4 at a predetermined position by means of a counting means for counting the drum clock pulses generated in synchronization with the rotation of said drum and releases the paper feed signal upon arrival of the counted number at a predetermined number.

In response to the aforementioned paper feed signal, the main sequence control circuit 203 transmits a paper feed signal to the electrophotographic process control circuit 205, which in turn switches on a paper feed control system for controlling a paper feed roller 15 and register rollers 16, 17 in the electrophotographic process executing unit. Thus a constantly driven paper feed roller 15 is lowered to become in contact with the uppermost transfer sheet 11 in the cassette 11-1, and separates and advances one sheet from said cassette in cooperation with the separating claws. On the other hand the register rollers 16, 17 located close are stopped simultaneously with the descent of said paper feed roller so that the transfer sheet 11 advanced from the cassette 11-1 is stopped at the leading end thereof by said rollers 16, 17 to form a slack. The rollers are again driven in synchronization with the leading end of image on the photosensitive drum approximately when the paper feed roller is again elevated, thereby advancing the transfer sheet at a speed identical with the peripheral speed of said drum 4.

Then the transfer sheet 11 is brought into close contact with the photosensitive drum 4 in the above-explained manner to conduct the transfer of image on the drum 4 onto said transfer sheet 11 by means of the transfer charger 12, and the transfer sheet after the transfer is separated from the drum 4 by the separator 18, then passes through the drying-fixing device 13 to conduct the fixation of toner particles on the transfer sheet and finally ejected to the tray 13-2 by means of an eject roller 13-1.

Now in the following there will be explained a means for generating timing signal for the end of print cycle.

In the present apparatus, as explained in the foregoing, the print cycle is initiated after rotation of the photosensitive drum 4 corresponding to 16 CP plus 4 CP upon turning on of the power supply, and the main sequence control circuit 203 starts, from said initiation of print cycle, a counting means for counting drum clock pulses and releases, upon reaching a determined count, a paper out signal as shown in FIG. 24(K) which is utilized as a timing signal for indicating the end of print cycle. The timing of release of said signal is rendered variable according to the paper sizes (for example A4 size, B5 size etc.) thereby modifying the print cycle accordingly and improving the print efficiency. The different print cycles corresponding to the paper size as mentioned above are identified by the signals from the cassettes 11-1 for different paper sizes.

Upon release of said paper out signal, if a photosensitive drum drive signal and a printer start signal are supplied from the image information generating device 201 through the interface circuit 202 to the main sequence control circuit 203, the succeeding print cycle is initiated at the first drum clock pulse after said paper out signal.

Also in case the present apparatus receives the photosensitive drum drive signal but not the printer start signal, the print cycle is terminated by said paper out signal but the photosensitive drum 4, the high-voltage source for various chargers and the flush exposure lamp 18 are maintained in operation. In this state, upon arrival of the printer start signal from the image information generating device 201 to the main sequence control circuit 203, the present apparatus initiates the print cycle after one drum clock pulse. The above-mentioned function intends to increase the throughout of the apparatus by synchronizing the image information generating device therewith relying on the printer start signal.

More specifically, for example if there is employed an image information generating device of a low speed, it may result that the image information to be transmitted in the succeeding print cycle cannot be prepared in the period from the start of a print cycle to the release of the paper out signal therefor. In such case the image information generating device 201 maintains a stand-by state with the photosensitive drum drive signal and the printer start signal respectively in ON and OFF states. In this state, as soon as the image information becomes prepared, the printer start signal is changed to ON state whereby the succeeding print cycle can be initiated by one drum clock pulse after said printer start signal.

Further, in case the photosensitive drum drive signal and the printer start signal are not transmitted to the present apparatus because the information transmission from the image information generating device 201 is completed, the print cycle is terminated and the photosensitive drum 4 is also stopped after a predetermined period. At the same time the high voltage source for various chargers and the flush exposure lamp 8 are turned off to enter a resting state.

The above-mentioned function is conducted because the service life of the photosensitive drum 4 and blade cleaner 14 will be shortened if the drum and the high voltage source are maintained in operation even after the completion of all the print cycles.

The period before entering said resting state is selected longer than the period required for ejection of the sheet 11 after the transfer and for cleaning of the entire surface of photosensitive drum 4.

The restart of the apparatus from a resting state after the end of the print cycles can be achieved by a photosensitive drum drive signal and a printer start signal from the image information generating device 201. Upon transmission of said signals therefrom through the interface circuit 202 to the main sequence control circuit 203, the present apparatus restores the state before entering the resting state to start the drum rotation and initiates the print cycle after 4 CP.

There will now be explained the function of a manual control circuit 204 shown in FIG. 23, which is composed of a switching element, for example a toggle switch, and is used for the maintenance of adjustment of the present apparatus.

More specifically said manual control circuit is adapted to release signals equivalent to the above-mentioned printer start signal, photosensitive drum drive signal, power on signal, paper feed signal, recording signal etc. to the main sequence control circuit 203 to control the functions of this apparatus, and is utilized for the maintenance, for example for process adjustment, of the present apparatus.

Now there will given an explanation on the trajectory of the aforementioned recording beam on the photosensitive drum 4 while making reference to FIG. 27, in which 224 indicates a recording area in which the actual information recording is performed on the photosensitive drum 4, while 225 indicates the scanning trajectory of the recording beam on the photosensitive drum. The recording beam forms a trajectory represented by a, b, c, d and e by the oscillating scanning by the galvanomirror scanner 34. In this case the photosensitive drum 4 is displaced at a constant speed in a direction of arrow 226, and the mirror 40 is located at a position represented by a dotted line 227, said position being considered equivalent to the position of the photoelectric converting element 42. However, as the recording beam contributes to the recording only when the beam crosses the recording area from left to right, the semi-conductor laser is controlled so as not to emit the recording beam at least when said beam crosses the recording area from right to left. More specifically the semi-conductor laser is controlled so as not to emit the recording beam when the recording beam, after following the trajectory b, reaches a boundary line D2 of said recording area 224.

While the recording beam being still cut-off, the galvanomirror reaches the turning point in the oscillation to initiate the succeeding trajectory c, during which the recording beams remains in the cut-off state even in the recording area. In FIG. 27 the full-lined trajectory indicates the trajectory of actual irradiation of recording beam, while the broken-lined trajectory is an imaginary trajectory which will be formed by the recording beam if it is actually emitted by the semi-conductor laser. Upon said imaginary beam passing through the recording area 224 along the trajectory c and reaching a line D3 positioned between the boundary line D1 of the recording area and the mirror position 227, the semi-conductor laser is controlled so as to emit the recording beam again. Upon arrival of the galvanomirror at the turning point dF in the oscillation thereof, there is initiated a succeeding trajectory d, during the course of which the semi-conductor laser is controlled so as to again suppress the laser beam emission at the position 227 and to initiate the recording beam emission at the starting line D1 of the recording area.

Thus the emission and cut off of recording beam are controlled similarly in each scanning cycle.

Said control of recording beam can be achieved by corresponding control of the semi-conductor laser by the output signal of a counter for the aforementioned clock pulses (not the drum clock pulses).

More specifically, upon arrival of the beam at the position 227 in the trajectory b, there is released a pulse Pb to be explained later which is supplied to the clear terminal of a counter CO and to the reset terminal R of a flip-flop FF shown in FIG. 27B, which thus releases a low-level output to the set output terminal thereof. Said counter CO also receives the clock pulses from the clock generator and releases, upon counting 200, 2248 and 5196 pulses, count pulse signals respectively to the terminals T1, T2 and T3.

Figure 27A:
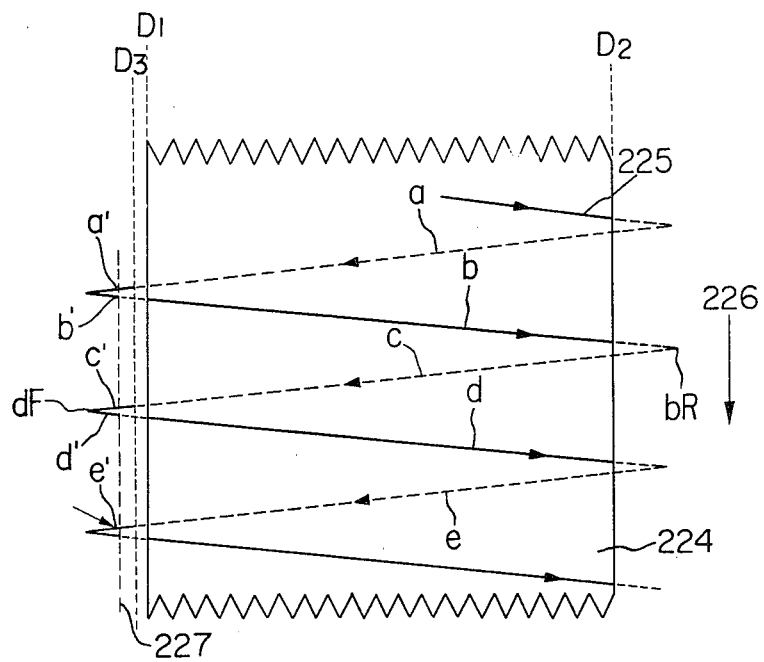
FIG. 27A is a schematic drawing showing the beam scanning state.
Figure 27B:
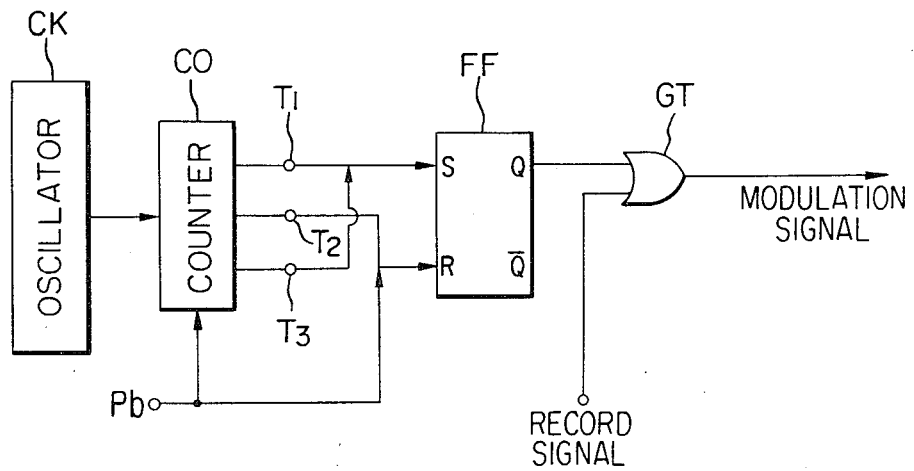
FIG. 27B is a circuit diagram for generating a control signal for controlling said beam.

In FIG. 27A the distances between the position 227 and line D1, between lines D1 and D2, between the line D2 and position bR and between the lines D1 and D3 respectively correspond to 200, 2248, 5196 and 100 clock pulses.

Thus, taking the position 227 as the starting point, the positions D1, D2 and D3 respectively correspond to 200, 2248 and 5196 clock pulses from said starting point. The terminals T1 and T3 of said counter CO being respectively connected to the set terminal S of said flip-flop FF while the terminal T2 being connected to the reset terminal R of said flip-flop, the set output terminal Q thereof releases a high-level signal and a low-level signal respectively during the full-lined period and the broken-line period in FIG. 27A.

Consequently the emission and cut-off of the beam as explained in the foregoing can be achieved by applying the output of said flip-flop FF and the recording signal (FIG. 24H) to an OR gate GT and controlling the semiconductor laser 24 by the output of said OR gate GT, wherein it is supposed that the semi-conductor laser terminates emission of beam upon receipt of a low-level signal.

Thus the photoelectric converting element 42, receiving the laser beam upon each passing thereof through the position 227, releases output pulses as shown in FIG. 26A, wherein the pulses Pa and Pb respectively corresponding to the trajectories a and b, and so on.

As the beam detection signals shown in FIG. 26A are utilized as the reference signal for determining the record starting position on the photosensitive drum 4, it is necessary to decide which of two consecutive pulses (for example Pa and Pb, or Pc and Pd) is to be used as said reference signal.

In the present embodiment the latter of said two consecutive beam detection pulses is utilized as the reference signal, and such method allows to provide a reference signal with a high precision even if the deflecting angle of the laser beam is somewhat changed.

Thus, upon passing of the recording beam through positions b', d', . . . , there is released by a gate circuit 214 to be explained later a detection signal (reference signal) shown in FIG. 26D, which is supplied to the image information generating device 201 as an information readout instruction signal for achieving the synchronization of main scanning thereby performing information recording during the forward displacement (from left to right in the illustration) of the oscillating scanning of galvanomirror.

In the following there will be given an explanation of an embodiment of the beam detecting circuit 207 while making reference to FIG. 25 showing the circuit structure of said detecting circuit 207 and to FIG. 26 showing a timing chart of said circuit.

As shown in FIG. 25, the beam detecting circuit 207 is composed of a recording beam detector 211, a comparator 212, a gate control circuit 213 and a gate circuit 214. Upon receipt of the recording beam in scanning motion by the galvanomirror scanner 34 on the drum 4, the recording beam detector 211 including the photoelectric converting element 42 supplies a recording beam detection signal shown in FIG. 26A to the comparator 212.

Said recording beam detector 211 is composed of a photoelectric converting element 42 such as a photodiode, and a current-voltage converting amplifier 215, which converts an output current from said converting element 42 proportional to the received light intensity into a voltage constituting the recording beam detection signal.

Upon receipt of said signal from the beam detector 211, the comparator 212 reforms the waveform as illustrated in FIG. 26B and supplies the thus reformed beam detection signal to the gate control circuit 213 and the gate circuit 214.

Said comparator 212 is composed of an operational amplifier 216, a variable resistor 217, and resistors 218, 219, 220, wherein said variable resistor 217 being used for varying the threshold voltage, which is a reference voltage for wave reforming, according to the level of said recording beam detection signal, while said resistor 218 being provided for matching the input impedance of comparator 212 with the output impedance of said beam detector 211, and said resistors 219 and 220 providing a hysteresis to the comparator 212 thereby allowing secure wave reforming function to the comparator 212.

Upon receipt of the beam detection signal as shown in FIG. 26B from said comparator 212, the gate control circuit 213 transmits a gate control signal shown in FIG. 26C to the gate circuit 214. Said gate control circuit 213 is composed of a monostable multivibrator 221 which generates a single pulse as shown in FIG. 26C when triggered by the recording beam detection signal from the comparator 212.

The time constant of a condenser 222 and a resistor 223 is so selected that the width T3 of said pulse is, as illustrated in FIG. 26, larger than the interval between two consecutive beam detection signals but is smaller than the repeating cycle of said beam detection signals.

The gate circuit 214, upon receipt of the gate control signal from said gate control circuit 213 and the recording beam detection signal from said comparator 212, releases, as a logic product, a detection signal (reference signal) shown in FIG. 26D to the interface circuit 202 which transmits said signal to the image information generating device 201.

Upon receipt of said signal through the interface circuit 202, the image information generating device 201 initiates, in synchronization therewith, the transmission of information signals for example of an image to the present apparatus for modulating the semi-conductor laser.

Figure 28:
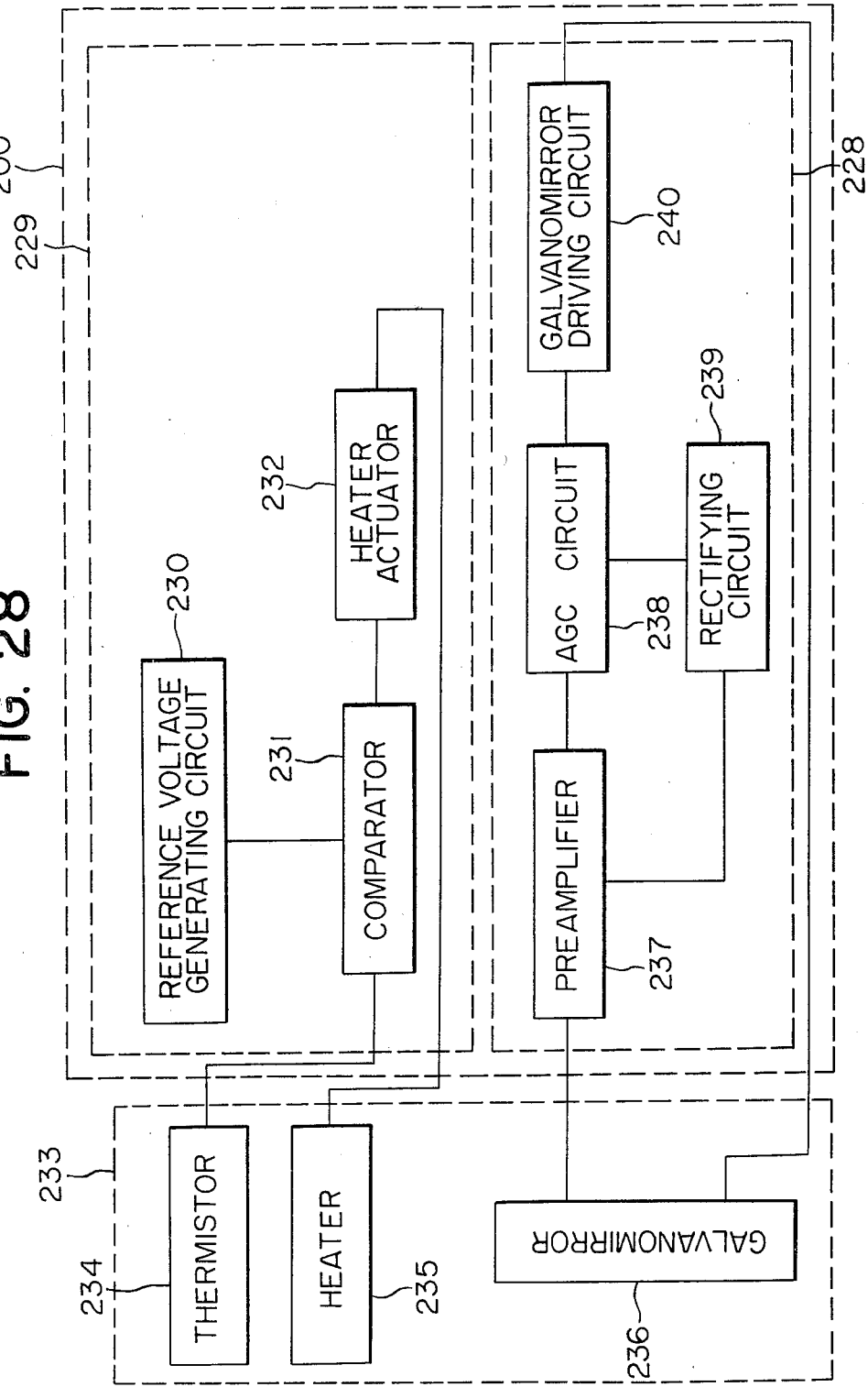
FIG. 28 is a block diagram of a galvano-mirror drive circuit.

FIG. 28 shows an embodiment of the galvanomirror control circuit 200 composed of a galvanomirror drive circuit 228 and a galvanomirror temperature control circuit 229.

The galvanomirror temperature control circuit 229 is composed of a reference voltage generating circuit 230, a comparator 231, as heater drive circuit 232, a thermister 234 mounted on the galvanomirror unit 233 and a heater 235. Said thermister 235 thermally connected to the galvonomirror 236 transmits a temperature detection signal of the galvanomirror itself to the comparator 231 which compares the level of said signal with the level of a reference voltage from said reference voltage generating circuit 230, and, according to the result of said comparison, releases a heater drive circuit control signal to said heater drive circuit 6.

The heater drive circuit, in response to said signal, controls the current supplied to the heater mounted on the galvanomirror in such a manner to decrease or increase the current to said heater respectively when the temperature of galvanomirror 236 is higher or lower than a predetermined value, thus reducing or increasing the heat generation from the heater to achieve a constant temperature of the galvanomirror.

By maintaining the galvanomirror at a constant temperature, it is rendered possible to avoid the variation by temperature of resonant frequency of the galvanomirror.

As shown in FIG. 28 the galvanomirror drive circuit is composed of a pre-amplifier 237, an AGC circuit 238, a rectifying circuit 239, and a galvanomirror drive circuit 240. The galvanomirror itself is provided with an angular velocity detecting coil which detects the change in angular velocity of galvanomirror as a change in the voltage.

The angular velocity detection signal from said coil is amplified to a desired level by the pre-amplifier 237, and then transmitted to the AGC circuit 238 and the rectifying circuit 239, thus achieving a gain control on the output signal level from said pre-amplifier 237 by controlling the AGC circuit 238 through the output of said rectifying circuit 239.

The output signal from the AGC circuit 238 is supplied to the galvanomirror drive circuit 240, which, in response to said signal, varies the current supplied to the galvanomirror drive coil for causing the oscillation of the galvanomirror thereby controlling the galvanomirror at an oscillation of a constant amplitude. For example, in case the oscillating amplitude of the galvanomirror becomes larger than the predetermined value, the AGC circuit 238, in response to the output signal from the rectifying circuit 239, functions to reduce the signal level transmitted from the pre-amplifier 237 to the galvanomirror drive circuit 240 thereby reducing the drive current to the galvanomirror drive coil and thus reducing the oscillating amplitude of the galvanomirror.

Also by maintaining the input and output signals of the galvanomirror drive circuit 228 at a same phase, the galvanomirror performs an autooscillation at a resonant frequency to be determined by the mechanical structure of the galvanomirror itself.

What we claim is:

1. A recording apparatus comprising:
   a beam generating means for generating a beam modulated by a modulating signal supplied thereto;
   a deflecting means for reciprocatingly deflecting the beam generated by said beam generating means repeatedly in two directions;
   a recording member for receiving said beam deflected by said deflecting means and recording the trajectory of irradiation of said beam;
   a recording information storage means for storing information to be recorded on said recording member, the recording information read from said information storage means being supplied to said beam generating means as said modulating signal;
   a beam detecting means provided along the path of the deflected beam on only one side of said recording member for releasing a beam detection signal upon detecting the arrival of said deflected beam at said detecting means; and
   a signal forming means for selecting one of a plurality of consecutive beam detection signals released from said beam detecting means during one reciprocation of the beam for forming a reference signal for instructing the initiation of the readout from said recording information storage means.

2. A recording apparatus according to claim 1 wherein said signal forming means comprises a delayed signal selecting means for selecting the latter of two consecutive beam detection signals.

3. A recording apparatus according to claim 1 further comprising a base support for supporting both said beam generating means and said deflecting means, and an adjusting means for varying the relative position of said base support to said recording member.

4. A recording apparatus according to claim 1 further comprising a frame for supporting said recording member, and a resilient fixing means for resiliently fixing said deflecting means to said frame.

5. A recording apparatus according to claim 1 wherein said beam generating means comprises a semiconductor laser for generating a laser beam, a first optical means for converting the laser beam from said semiconductor laser into a parallel beam, and a second optical means for expanding the diameter of the beam obtained from said first optical means.

6. A recording apparatus according to claim 5 wherein said beam generating means further comprises a relative position adjusting means for adjusting the relative positions of said semi-conductor and said first optical means.

7. A recording apparatus comprising:
   a beam forming means for forming a beam modulated by a modulating signal and placed in repetitive reciprocating scanning motion;
   a recording member for receiving the beam formed by said beam forming means and recording the trajectory of irradiation of said beam;
   a beam detecting means provided on only one side of said recording member for detecting the arrival of said beam and thereupon releasing a beam detection signal;
   a timing means adapted to be activated by a predetermined one of a plurality of beam detection signals obtained from said beam detecting means during one reciprocation of the beam and to detect the lapse of a predetermined period after said activation; and
   a selecting means for selecting another one of said plurality of beam detecting signals in response to the output of said timing means as a reference signal which is used for controlling the start of modulation of the beam in said beam forming means.

8. A recording apparatus according to claim 7 wherein said selecting means is adapted to select the last one of said plurality beam detection signals.

9. A recording apparatus according to claim 7 wherein said predetermined period of said timing means is selected at least longer than the period from the release of the first beam detection signal to the release of the succeeding beam detection signal.

10. A recording apparatus according to claim 9 wherein said selecting circuit is composed of a gate circuit for receiving the timing output of said timing means and said plurality of beam detection signals.

11. A recording apparatus according to claim 7 wherein said timing means is composed of a one-shot multivibrator receiving the output of said beam detecting mens, and said selecting means is composed of a gate circuit receiving the output of said one-shot multivibrator and the output of said beam detecting means.

12. A recording apparatus comprising:
a semi-conductor laser means for generating a beam, the emission of which is controlled according to a modulating signal applied thereto;
a first temperature detecting means for detecting the temperature of said semi-conductor laser means;
a first temperature adjusting means for maintaining said semi-conductor laser means at a predetermined temperature in response to the detected temperature by said first temperature detecting means;
a beam deflecting means for receiving the beam generated by said semi-conductor laser means and for deflecting said beam by periodic oscillation;
a second temperature detecting means for detecting the temperature of said beam deflecting means;
a second temperature adjusting means for maintaining said beam deflecting means at a predetermined temperature in response to the detected temperature of said second temperature detecting means;
a recording member for receiving said beam deflected by said beam deflecting means and for recording the trajectory of irradiation of said beam; and
a forming means for detecting the arrival of said deflected beam and for forming a reference signal for controlling the start of modulation of said semi-conductor laser means.

13. A recording apparatus according to claim 12 wherein said first temperature adjusting means is provided with a heating and cooling member.

14. A recording apparatus according to claim 13 wherein said semi-conductor laser means is mounted on a metal support which is in turn fixed on said heating-cooling member.

15. A recording apparatus according to claim 14 wherein said first temperature detecting means is mounted on said metal support.

16. A recording apparatus according to claim 12 wherein said second temperature adjusting means is provided with a heating member.

17. A recording apparatus comprising:
a beam forming means for forming a beam modulated by a modulating signal and placed in repetitive reciprocating scanning motion;
a recording member for receiving said beam formed by said beam forming means and recording the trajectory of irradiation of said beam in a predetermined recording area;
a beam position detecting means positioned on only one side of the recording area on said recording member for detecting the arrival of said beam;
a control means for performing a control in such a manner that said beam is not emitted from said beam forming means during the return motion of such reciprocating scanning at least until said beam is outside of said recording area and before reaching the beam position detecting means; and
a reference signal forming means for forming a reference signal for controlling the start of modulation for recording by said beam forming means in response to one of a plurality of detection signals obtained from said beam position detecting means during a reciprocation of the scanning beam.

18. A recording apparatus according to claim 17 wherein said controlling means performs the control in such a manner that said beam is not emitted by said beam forming means, during the succeeding forward motion of said beam, after the arrival of said beam at said beam position detecting means and before reaching said recording area.

19. A recording apparatus according to claim 17 wherein a beam modulated by a recording signal is irradiated on said recording area during the forward motion of said beam.

20. A recording apparatus according to claim 19 wherein said control means performs the control in such a manner that said beam is not emitted by said beam forming means during forward motion of said beam after said beam leaves said recording area.

21. A recording apparatus according to claim 17, 18, 19 or 20 wherein said control means comprises a signal generating means for generating signals of a determined frequency, a counting means for counting signals obtained from said signal generating means, and a modulating signal forming means for forming a modulating signal to be supplied to said beam forming means in response to the output of said counting means.

22. A recording apparatus comprising:
a beam generating means for generating a beam modulated by a modulating signal applied thereto;
a deflecting means for deflecting the beam generated by said beam generating means to perform repetitive reciprocating scanning;
a recording member for receiving the beam deflected by said deflecting means and recording the trajectory of irradiation of said beam;
a recording information storage means for storing the information to be recorded on said recording member, the recording information read from said storage means being applied as the modulating signal to said beam generating means; and
a forming means for obtaining a reference signal indicating the scanning direction and position of said beam for each cycle of reciprocating scanning of said beam in order to control the start of readout of said information from said storage means, said forming means being provided with a beam detector located outside said recording area on said recording member and along the trajectory of said scanning beam to detect the arrival of said beam.

23. A recording apparatus according to claim 22 wherein said recording member is composed of a photosensitive drum capable of forming a latent image upon irradiation by said beam.

24. A recording apparatus according to claim 22 wherein said deflecting means comprises a reflecting member for reflecting said beam and a rotating means for periodically oscillating said reflecting member.

25. A recording apparatus according to claim 22 wherein said beam generating means is a semi-conductor laser.

26. A recording apparatus according to claim 22 wherein said forming means comprises a selecting means for selecting one of a plurality of beam detection outputs obtained from said beam detector.

27. A recording apparatus according to claim 22 further comprising a base support for supporting both said beam generating means and said deflecting means, and an adjusting means for varying the relative positions of said base support to said recording member.

28. A recording apparatus according to claim 22 further comprising a frame for supporting said recording member, and a resilient fixing means for resiliently fixing said deflecting means to said frame.

29. A recording apparatus according to claim 22 wherein said beam generating means comprises a semiconductor laser for generating a laser beam, a first optical means for converting the laser beam from said semiconductor laser into a parallel beam, and second optical means for expanding the diameter of the beam obtained from said first optical means.

30. A recording apparatus according to claim 29 wherein said beam generating means further comprises a relative position adjusting means for adjusting the relative positions of said semi-conductor and said first optical means.

31. A recording apparatus comprising:
beam generating means for generating a beam modulated by a modulating signal;
a recording member for receiving said beam to record thereon the trajectory of irradiation of said beam;
deflecting means for reciprocatingly deflecting the beam to reciprocatingly scan in two directions;
signal forming means for detecting the direction of scanning of said beam and forming a reference signal indicative of a predetermined direction of the scanning; and
control means for starting, in accordance with the formation of said reference signal, the modulation of said beam by recording signals.

* * * * *

UNITED STATES PATENT AND TRADEMARK OFFICE
CERTIFICATE OF CORRECTION

PATENT NO. : 4,351,005

DATED : September 21, 1982

INVENTOR(S) : NOBUHIRO IMAI, ET AL.

It is certified that error appears in the above-identified patent and that said Letters Patent is hereby corrected as shown below:

Column 5, line 4, "structures" should read --structured--.

Column 10, line 29, "of" should read --by--;
line 30, "191" should read --119--.

Column 12, line 53, "miror" should read --mirror--.

Column 14, line 38, "to prompt" should read --for prompt--.

Column 18, line 16, "explained is there will now be a" should read --There will now be explained a--.

Column 20, line 41, "beams" should read --beam--.

Column 24, line 66, "mens" should read --means--.

Signed and Sealed this

Fifteenth Day of March 1983

[SEAL]

Attest:

GERALD J. MOSSINGHOFF

Attesting Officer

Commissioner of Patents and Trademarks